United States Patent
Neely

(10) Patent No.: US 8,985,318 B2
(45) Date of Patent: Mar. 24, 2015

(54) CONVEYOR BELT WITH COMPOSITE LINK

(75) Inventor: Darroll Joseph Neely, Gerrardstown, WV (US)

(73) Assignee: Ashworth Bros., Inc., Fall River, MA (US)

( * ) Notice: Subject to any disclaimer, the term of this patent is extended or adjusted under 35 U.S.C. 154(b) by 51 days.

(21) Appl. No.: 13/472,096

(22) Filed: May 15, 2012

(65) Prior Publication Data

US 2013/0306446 A1 Nov. 21, 2013

(51) Int. Cl.
*B65G 17/08* (2006.01)
*B65G 17/06* (2006.01)

(52) U.S. Cl.
CPC ............ *B65G 17/063* (2013.01); *B65G 17/083* (2013.01)
USPC ........................................................ 198/853

(58) Field of Classification Search
CPC ................................ B65G 17/06; B65G 17/08
USPC ........................................................ 198/853
See application file for complete search history.

(56) References Cited

U.S. PATENT DOCUMENTS

| | | | |
|---|---|---|---|
| 3,646,752 A | 3/1972 | Kampfer | |
| 3,700,287 A | 10/1972 | Persin | |
| 4,611,710 A * | 9/1986 | Mitsufuji | 198/867.15 |
| 4,846,339 A | 7/1989 | Roinestad | |
| 4,895,248 A | 1/1990 | Wahren | |
| 5,088,920 A | 2/1992 | Reunamaki | |
| 5,141,102 A | 8/1992 | Roinestad et al. | |
| 5,197,591 A * | 3/1993 | Roinestad et al. | 198/867.1 |
| 5,271,491 A * | 12/1993 | Irwin | 198/778 |
| 5,439,097 A * | 8/1995 | Takahashi et al. | 198/867.01 |
| 5,954,188 A | 9/1999 | Etherington et al. | |
| 6,079,552 A | 6/2000 | Reichert et al. | |
| 6,142,294 A | 11/2000 | Kobayashi et al. | |
| 6,161,685 A | 12/2000 | Stebnicki | |
| 6,360,882 B1 * | 3/2002 | Maine et al. | 198/852 |
| 6,615,979 B2 * | 9/2003 | Etherington et al. | 198/851 |
| 6,948,613 B2 * | 9/2005 | Guldenfels et al. | 198/853 |
| 7,073,662 B2 | 7/2006 | Neely et al. | |
| 7,530,454 B2 * | 5/2009 | Neely et al. | 198/853 |
| 7,779,990 B2 * | 8/2010 | Ferrari et al. | 198/688.1 |
| 7,802,676 B2 * | 9/2010 | Guldenfels et al. | 198/853 |
| 8,033,388 B2 * | 10/2011 | Russell | 198/850 |
| 8,430,235 B2 * | 4/2013 | Menke et al. | 198/853 |

(Continued)

FOREIGN PATENT DOCUMENTS

| | | |
|---|---|---|
| EP | 0083119 | 7/1983 |
| EP | 0323819 | 7/1989 |

(Continued)

OTHER PUBLICATIONS

International Search Report and Written Opinion, mailed Feb. 12, 2014, for International Application No. PCT/US2013/040838, filed May 14, 2013.

(Continued)

*Primary Examiner* — Gene Crawford
*Assistant Examiner* — Thomas Randazzo
(74) *Attorney, Agent, or Firm* — Plumsea Law Group, LLC

(57) ABSTRACT

A link for a modular conveyor belt may include a supporting structure and a bearing structure covering at least a portion of the supporting structure. The supporting structure may have a tensile strength that is higher than the bearing structure, and the bearing structure may be more resistant to wear than the supporting structure.

53 Claims, 28 Drawing Sheets

(56) References Cited

U.S. PATENT DOCUMENTS

| | | |
|---|---|---|
| 2006/0006669 A1* | 1/2006 | Nelsen et al. ............... 292/216 |
| 2007/0175738 A1 | 8/2007 | Neely et al. |
| 2009/0218199 A1 | 9/2009 | Russell |
| 2011/0284347 A1* | 11/2011 | MacLachlan et al. ........ 198/851 |
| 2012/0043184 A1 | 2/2012 | Marshall et al. |

FOREIGN PATENT DOCUMENTS

| | | | | |
|---|---|---|---|---|
| NL | WO2007/067047 | * | 6/2007 | ............. B65G 17/08 |
| NL | WO 2007/067047 | * | 6/2007 | ............. B65G 17/08 |
| WO | 9528343 | | 10/1995 | |

OTHER PUBLICATIONS

U.S. Appl. No. 13/311,773, filed Dec. 6, 2011.
U.S. Appl. No. 13/311,797, filed Dec. 6, 2011.
U.S. Appl. No. 13/311,882, filed Dec. 6, 2011.
U.S. Appl. No. 13/311,888, filed Dec. 6, 2011.
U.S. Appl. No. 13/311,900, filed Dec. 6, 2011.
International Preliminary Report on Patentability and Written Opinion for Application No. PCT/US2013/040838, mailed Nov. 18, 2014.

* cited by examiner

CONVEYOR BELT WITH COMPOSITE LINK

BACKGROUND

1. Field of the Invention

The present disclosure relates generally to components for modular conveyor belts. More particularly, the present disclosure relates to composite links for modular conveyor belts.

2. Description of Related Art

Conveyor belts are popularly used in a number of different industrial fields to provide continuous motion of goods during manufacture, shipping, and other processes. Industrial conveyor belts generally include a series of spaced apart rods connected via a series of links, which are welded or otherwise coupled to the rods. Such belts are commonly referred to as modular conveyor belts.

For the manufacture of small items, the rods may be covered with a fabric, plastic, or metal overlay, such as a mesh, to prevent the small items from slipping between the rods and falling to the manufacturing floor. Further, the structure of the links that make up modular conveyor belts varies.

Generally, conveyor belts and links are formed of either metal or plastic. Metal conveyor belt links typically have excellent strength properties, but exhibit wear at surfaces where the links contact the rods. On the other hand, plastic conveyor belt links are typically resistant to wear at contact surfaces, but are sometimes less strong than metal belts commonly resulting in failure due to fatigue and/or excess loading.

Generally, although metal and plastic belts typically differ as to the mode of failure, comparable metal and plastic belts commonly have similar longevity. That is, metal belts commonly last as long as a plastic belt configured for similar duty, however, the plastic belt will typically fail due to fatigue or an instantaneous load spike, whereas the metal belt will fail due to wear. For similarly structured plastic and metal links, a metal link may have a tensile strength that is 2-3 times that of a comparable plastic link. In addition, different portions of a turn curve conveyor belt are loaded differently, such that a material that may be well-suited for a given portion of a conveyor belt may be less well-suited for other portions of the conveyor belt.

These and other problems exist with respect to conveyor belts and/or conveyor belt links.

SUMMARY

A conveyor belt edge link formed of a material to provide strength and prevent fatigue and a material to reduce wear, and a conveyor belt that incorporates such edge and other similar links, is described. In some embodiments, the link is a composite link formed of a metal connecting structure that provides strength to the link and a bearing structure that reduces wear on surfaces of the link by inhibiting metal-to-metal contact. This allows the link to have the advantages of both metal links, which are strong and less prone to fatigue than plastics, and plastic links, which are not as prone to wear as metal links.

In one aspect, the present disclosure is directed to a link for a modular conveyor belt. The link may include a supporting structure and a bearing structure covering at least a portion of the supporting structure. The supporting structure may have a tensile strength that is higher than the bearing structure, and the bearing structure may be more resistant to wear than the supporting structure.

In another aspect, the present disclosure is directed to a link for a modular conveyor belt including an elongated connecting rod and a driving mechanism. The link may include a supporting structure formed of a first material, wherein the supporting structure includes a contour that establishes a shape of the composite link. In addition, the link may include a bearing structure formed of a second material, wherein the bearing structure is located on an engagement surface of the supporting structure that is configured to engage at least one conveyor belt component. The bearing structure may be configured to prevent the at least one conveyor belt component from contacting the engagement surface of the supporting structure.

In another aspect, the present disclosure is directed to a modular conveyor belt, including at least a first link and a second link, and an elongated connecting rod configured to hingedly attach the first link and the second link to one another. The first link may include a supporting structure and a bearing structure covering at least a portion of the supporting structure, the supporting structure having a tensile strength that is higher than the bearing structure, and the bearing structure being more resistant to wear than the supporting structure.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The present disclosure describes systems and methods for providing modular conveyor belt links with both wear resistance and strength.

Figure 1:
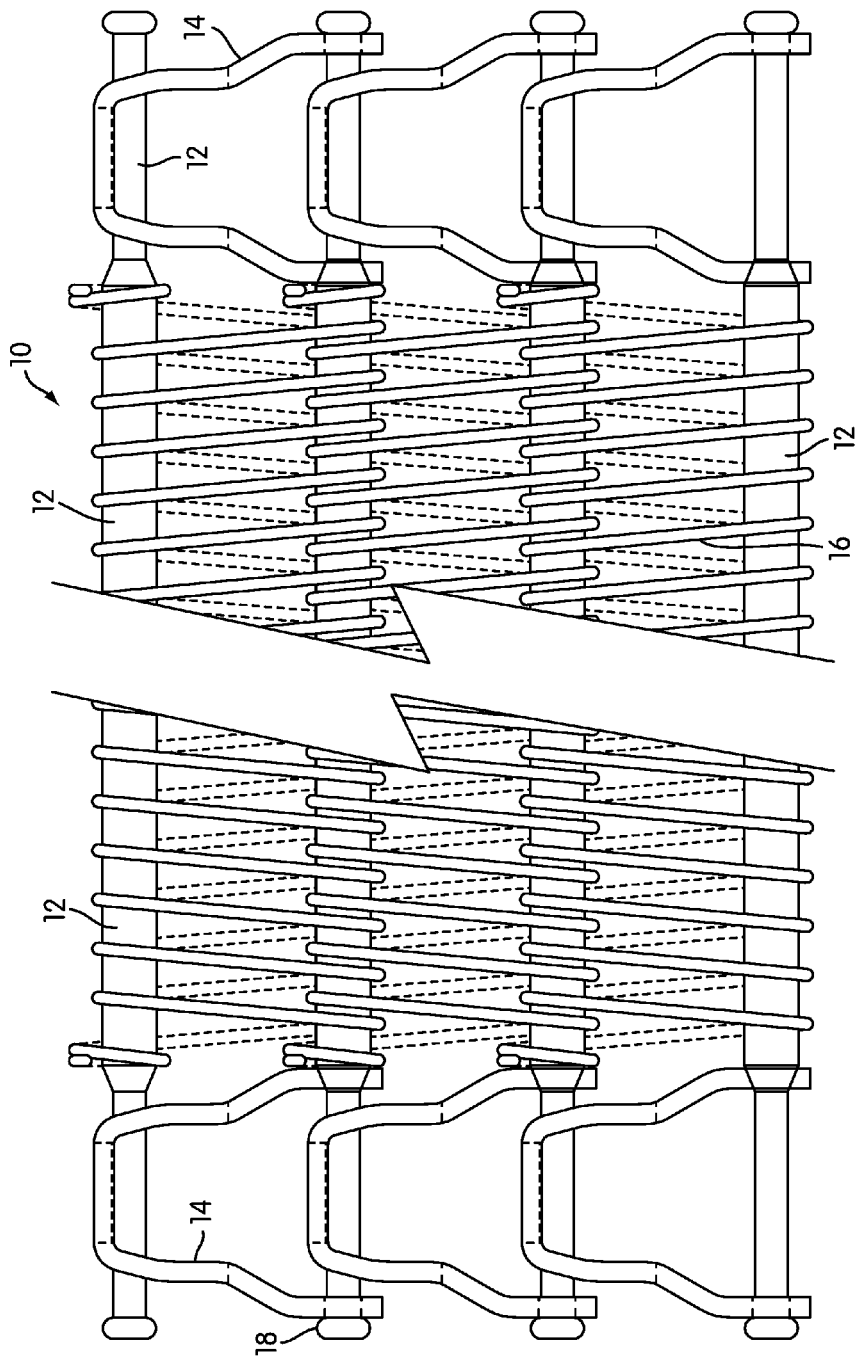
FIG. 1 is an illustration of an exemplary modular conveyor belt.

Examples of basic conveyor belt structures and manufacturing methods can be found in U.S. Pat. No. 5,954,188, which is incorporated herein by reference. The accompanying FIG. 1 corresponds to FIG. 1 of the '188 patent, and illustrates a typical prior art modular conveyor belt 10. Conveyor belt 10 includes rods 12 connected by links 14 and covered by a mesh 16 to provide additional support for the goods transported on conveyor belt 10.

In some cases, a buttonhead 18 may be formed on the ends of rods 12 to act as a stop for links 14. A weld is also typically formed between buttonhead 18 and link 14 for a stronger and more secure connection between rods 12 and links 14. In other cases, a buttonless configuration may be employed, wherein the rod is welded to the link without creating a significant protrusion beyond the leg of the link.

Figure 2:
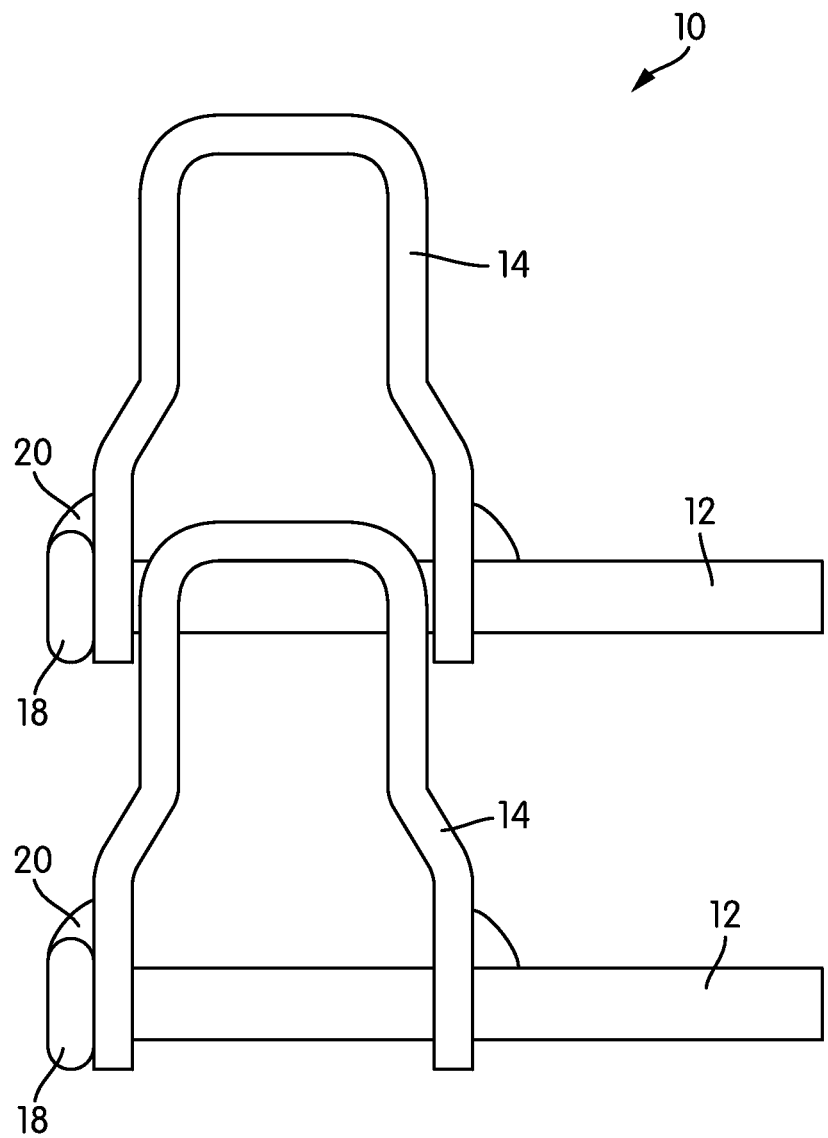
FIG. 2 is an enlarged view of a portion of the conveyor belt shown in FIG. 1.

FIG. 2 shows an enlarged view of a portion of prior art conveyor belt 10, showing rods 12 formed with buttonheads 18. In addition, FIG. 2 also shows a weld 20 fastening buttonhead 18 and, therefore, rod 12, to link 14.

The term "conveyor belt," as used in the present disclosure, generally refers to any type of endless track or belt, typically configured to be driven by a geared mechanism or drum. The term "conveyor belt" should not be considered to be limited to any particular type of conveyor belt unless otherwise specified herein.

The directional term "lateral" or "laterally," as used in the present disclosure, refers to an outwardly direction relative to the centerline of the entire conveyor belt.

The term "longitudinal" as used in the present disclosure and claims refers to a direction in which the conveyor belt travels. Further the term longitudinal refers to both forward and backward directions of conveyor belt travel.

The term "vertical," as used in the present disclosure and claims refers to the up and down direction relative to the ground.

The conveyor belt systems, and methods of building such systems, as described herein, may include different types of conveyor belts. In some embodiments, the conveyor belts may be modular conveyor belts. Modular belts may be formed of intermeshing modules, disposed in laterally extending rows, that are rotatably joined longitudinally. In some cases, a row of a modular belt may include multiple modules disposed laterally, and joined, for example, by a connecting rod. Modular belt modules may include laterally-aligned rod holes or slots at the forward and rearward portions of each row.

The term "link," as used in the present disclosure and claims, refers to a basic component of a conveyor belt row. For example, one individual link may be repeated laterally in order to form an entire row of links. In some embodiments, only two links per row are provided (at each end of the rod). In some embodiments, the links are capable of rotating independently from one another. In some embodiments, two or more links may be rigidly attached to one another.

The term "rod" or "connecting rod" refers herein to an elongated member used to associate links together. When associated, the links and rod form a basic modular conveyor belt.

The term "pitch" refers herein to one row of links extending from one lateral edge of the conveyor belt to the opposite lateral edge. In some embodiments, the pitch may be formed of one piece so that all the links in the same row are rigidly attached to one another. In other embodiments, the pitch may have multiple individual links arranged side-to-side, allowing each individual link to rotate with respect to one another. In other embodiments, the pitch may include a minimal number of links, such as only end links connected by connecting rods. In some embodiments, the pitch may include not only end links, but also one or more spaced-apart intermediate links positioned between the end links along the connecting rod.

The term "end link" refers herein to the most laterally disposed link in the pitch, or the terminating link for the pitch in a row. In some embodiments each pitch may have two end links, one end link for each side of the conveyor belt.

The term "retention cage" refers herein to a structure that is associated with the end link such that the retention cage is located on the side of the end link that is outward from the centerline of the conveyor belt. In other words, the retention cage forms the edge of the conveyor belt. In some embodiments, the retention cage secures the connecting rod so that the rod is not inadvertently removed from the conveyor belt during operation, assembly, or any other time.

Figure 3:
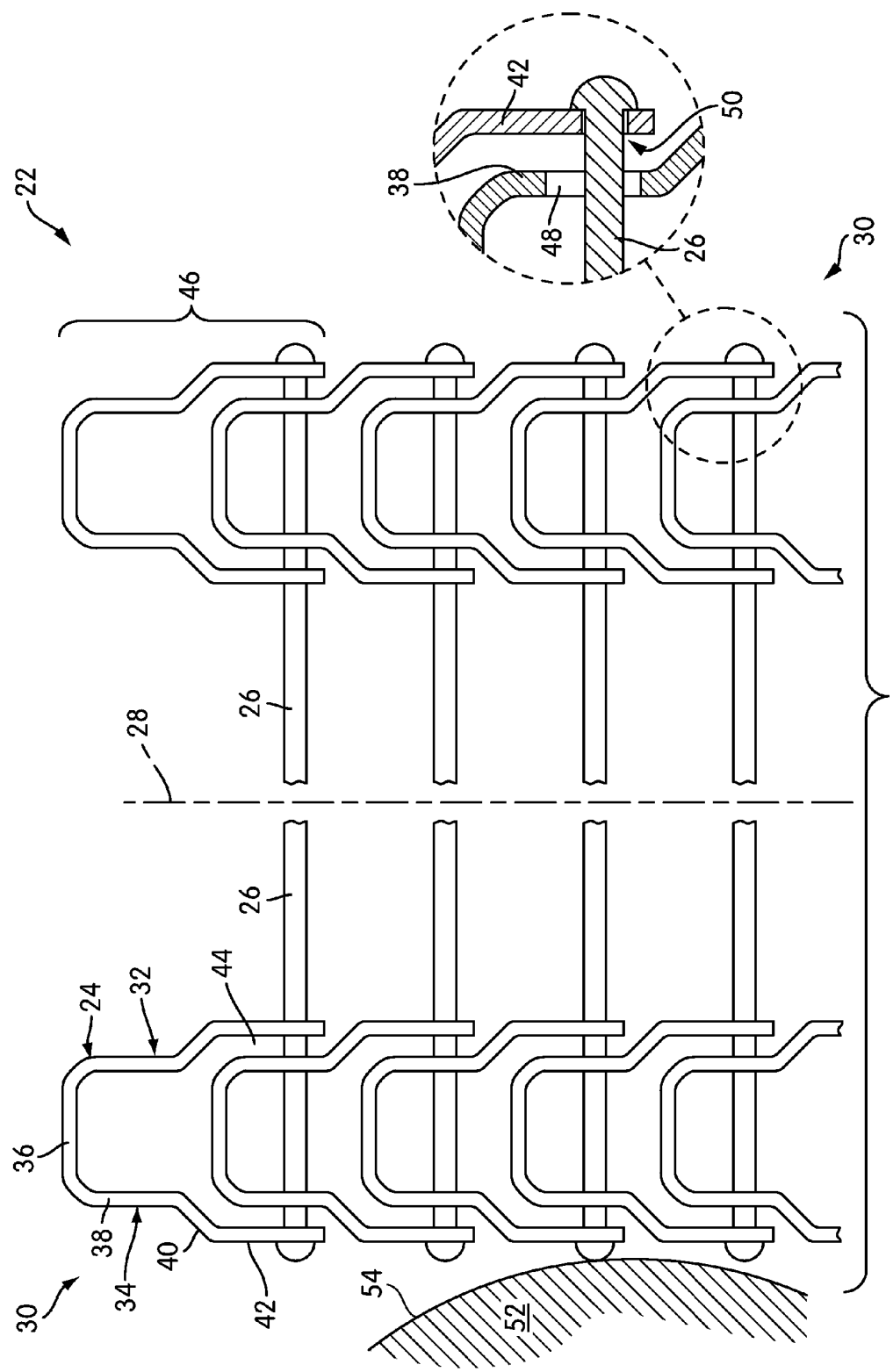
FIG. 3 is an illustration of an exemplary turn-curve conveyor belt.

FIG. 3 shows a top view of an exemplary modular conveyor belt 22. As illustrated in FIG. 3, conveyor belt 22 may include a plurality of links 24 connected by a plurality of elongated rods 26. A center line 28 indicates the approximate midline of conveyor belt 22. Conveyor belt 22 may include outer ends 30. For purposes of this disclosure, the term "outer," as used in this description and the appended claims, shall refer to a direction toward outer ends 30 of conveyor belt 22 and away from center line 28. Conversely, the term "inner" shall refer to a direction toward center line 28 and away from outer ends 30 of conveyor belt 22. In addition, for purposes of this disclosure, the term "longitudinal direction" shall refer to the direction in which center line 28 is oriented.

As shown in FIG. 3, all of rods 26 may be substantially similar in shape and dimension, with each of rods 26 being an elongated cylindrical body formed of an elongated portion of a rod material. In some embodiments, rods 26 may be made from a metal material, such as steel, stainless steel, aluminum, titanium, and/or other metals. In other embodiments, rods 26 may be made from a non-metallic material, such as plastic, wood, carbon fiber, and/or other non-metallic materials. In some embodiments, rod 26 may be a substantially hollow tube or pipe. In other embodiments, rod 26 may be solid.

The inner portions of rods 26 (near center line 28) are truncated in FIG. 3 for purposes of illustration. Rods 26 may be any suitable length for supporting and carrying a variety of wares. In some embodiments, rods 26 may have a uniform or substantially uniform diameter along the length of the cylindrical body. The diameter may be selected based upon factors such as the type of goods being moved on conveyor belt 22, the width of conveyor belt 22, and/or other considerations. In some embodiments, rods 26 may include tapering or stepped configurations.

As shown in FIG. 3, rods 26 may be operatively connected to each other with links 24. In some embodiments, links 24 may be substantially U-shaped, wherein each link 24 is constructed with two legs, including an inner leg 32 and an outer leg 34, joined by a connecting member 36. In some embodiments, inner leg 32 and outer leg 34 may be mirror-image forms. Accordingly, as the configuration of inner leg 32 and outer leg 34 are identical save for opposing orientation, for the sake of clarity, only the structure of outer leg 34 is discussed with particularity. Outer leg 34 may include a relatively straight upper portion 38 connected by an outwardly-tapering transition region 40 to a relatively straight lower portion 42. This configuration creates a wider lower opening 44 to allow for the interconnection of links 24, as connecting member 36 of one link may readily slide into a nesting relationship with lower portion 42 of an adjacent link. In some embodiments, the fitment of one link within another may be a relatively loose fitment, allowing several millimeters of lateral movement between the components. In other embodiments, the fitment may be substantially tighter, leaving only minimal space between the components, and thus, maintaining the links in a consistent alignment when nested.

It will be appreciated that the form of the links joining together elongate rods is not limited to the configurations shown and discussed in the present disclosure. In some embodiments, the configuration of the connective links may be simpler than link 24. For example, in some embodiments, each leg of the link may include a single straight portion. Alternatively, the configuration of the connective link may be more involved for certain applications. For example, embodiments are envisioned wherein the connective links have more bends and/or a more complex shape than link 24. In addition, although inner leg 32 and outer leg 34 are shown in the accompanying drawings as having mirror images of each other to provide symmetry for link 24, in other embodiments, link 24 may be asymmetrical.

Each rod 26 may be fixedly attached to two links 24 (for example by welding), one at each end of the rod, forming a pitch 46. Pitches 46 may be rotatably connected to one another. For example, each rod 26 may pass through openings 48 in upper portions 38 of outer legs 34 and through corresponding openings in inner legs 32. While rods 26 may be fixedly attached to outer leg 34 at or near opening 50 in lower portion 42, rods 26 may be free to rotate within the openings 48 in upper portions 38 and the counterpart openings in inner legs 32.

In some cases, conveyor belts may be configured for a straight path of conveyance. Such belts are often referred to as "straight run" conveyor belts. In other cases, conveyor belts may be configured for turning laterally to the left and/or right. Such belts are often referred to as "turn curve" conveyor belts. In order to navigate curves, modular conveyor belts may be collapsible longitudinally. In some cases, the entire width of the belt may be collapsible longitudinally. In other cases, only one end of the belt may be collapsible, for example, when the belt is only needed to turn in one direction. Belts may be made collapsible by utilizing longitudinally oriented slots instead of circular holes to receive the rods. The structure that enables collapsibility of conveyor belts is discussed in greater detail below.

Conveyor belt 22, as shown in FIG. 3, may be a collapsible type of conveyor belt. That is, the belt pitches may be movable longitudinally with respect to one another. In order to facilitate this longitudinal collapsibility, the openings 48 in upper portions 38 of outer legs 34 and counterpart openings in inner legs 32 may be longitudinally slotted, as shown in FIG. 3, thus allowing for longitudinal translation of a rod of a given pitch 46 within a link of an adjoining pitch.

Conveyor belt 22 may be collapsible at both outer ends 30 or at only one of outer ends 30. Further, in some embodiments, outer ends 30 may be independently collapsible, that is, each end 30 may be collapsible independent of the opposite outer end 30 of conveyor belt 22. This independent collapsibility may enable conveyor belt 22 to be propelled around turns. That is, when being propelled around a turn, the outer end 30 of conveyor belt 22 that is on the inside of the turn may collapse longitudinally, whereas the outer end 30 on the outside of the turn may remain expanded longitudinally. Such a conveyor belt may be referred to as a "turn-curve" conveyor belt.

Conveyor belt 22 may be driven, pulled, propelled, and/or guided by a structure such as a drum 52. Drum 52 may have a drive surface 54, which may contact outer end 30 of conveyor belt 22. In some embodiments, drum 52 may be configured to simply guide conveyor belt 22 along a designated path. That is, a separate drive mechanism may propel conveyor belt 22, and drum 52 may guide conveyor belt 22 along the designated path. In other embodiments, drum 52, in addition to guiding conveyor belt 22, may also be configured to propel conveyor belt 22. Thus, conveyor belt 22 may be configured to contact drive surface 54.

The drive surface of the drum or other such propulsion or guidance device may be configured to engage a conveyor belt. The drive surface may be made of any suitable material for such contact. For example, the drive surface of the drum may be made of rubber, plastic, metal, and other suitable materials. These materials can be hard, abrasive, and/or may carry debris that acts as an abrasive during contact of the drive surface with the contact weld on an outer portion of the conveyor belt.

In some cases, conveyor belts may be flat top belts. Flat top belts are manufactured with a support surface on one face of the links so that the surface abuts an adjacent link, therefore leaving no significant open areas between rows, or pitches.

In some embodiments, the belts may be picket style belts. Picket style belts have transverse links resembling the shape of a square wave mathematical function. The links in picket style belts have laterally aligned rod holes or slots allowing for a connecting rod to be inserted.

In some cases, the pickets or "pitches" of picket style belts may have the formed of an oscillating flat member. Such picket style belts are referred to as "flat wire" style belts. Examples of basic flat wire style conveyor belt structures and manufacturing methods can be found in U.S. Pat. Nos. 4,846, 339 and 5,954,188, which are incorporated herein by reference. These structures and methods of manufacturing are generally applicable to the conveyor belt embodiments described herein.

Figure 4:
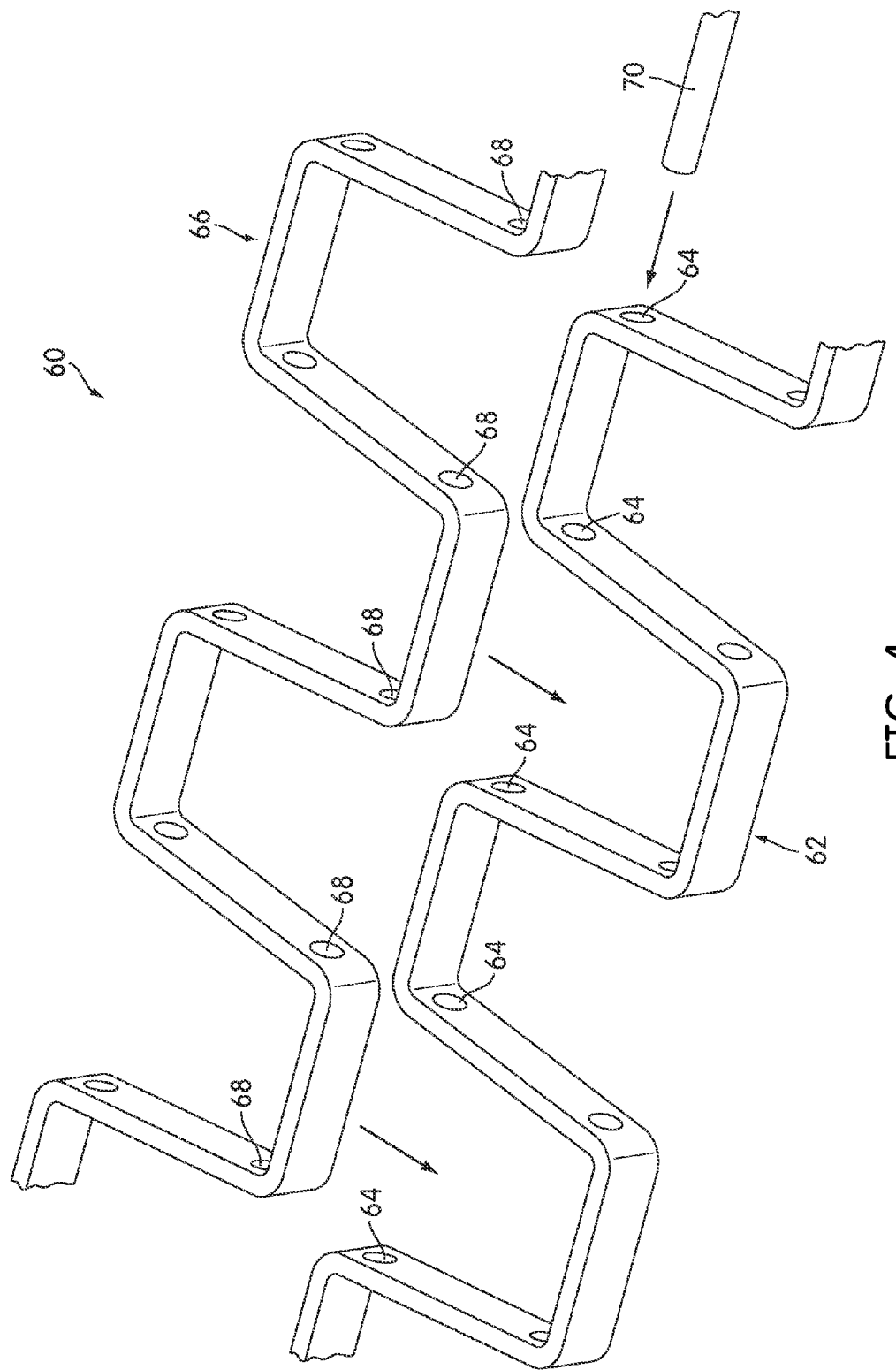
FIG. 4 is a perspective view of an exemplary prior art flat wire conveyor belt.

FIG. 4 is a schematic view of two pitches of a prior art flat wire style conveyor belt 60. As can be seen in FIG. 4, flat wire belt 60 may include a first pitch 62, which may have multiple rod receiving apertures 64. Belt 60 may also include a second pitch 66. Second pitch 66 may also include multiple rod receiving apertures 68. When rod receiving apertures 64 are aligned with rod receiving apertures 68, a substantially straight rod receiving path, configured to receive a connecting rod 70, is formed extending transversely across second pitch 66.

In order to assemble a conveyor belt using first pitch 62 and second pitch 66, first pitch 62 may be positioned adjacent to a second pitch 66. First pitch 62 is then engaged with or interconnected with second pitch 66 so that first pitch rod receiving apertures 64 align with second pitch rod receiving apertures 68 to form a rod receiving path. The rod receiving path enables connecting rod 70 to be pushed through both first pitch rod receiving apertures 64 and second pitch rod receiving apertures 68 to associate first pitch 62 and second pitch 66.

Another type of conveyor belt is a finger style belt. Finger style belts may include links that feature a straight or zig-zag central transverse rib from which finger-like protrusions extend in the forward and/or rearward direction. The fingers typically have laterally aligned rod holes or slots allowing for a connection rod to be inserted.

Figure 5:
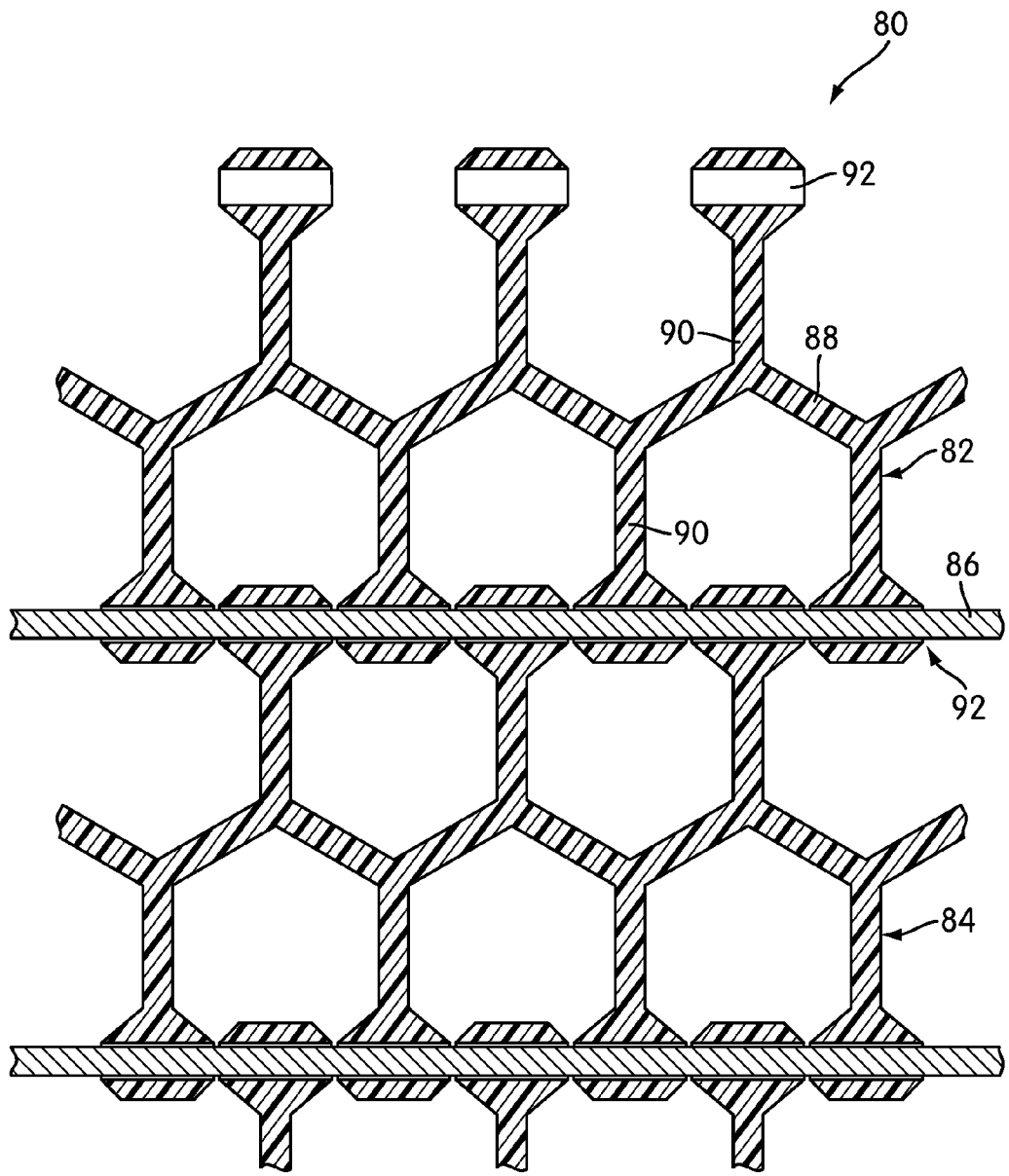
FIG. 5 is a cross-sectional view of an exemplary finger style conveyor belt.

FIG. 5 illustrates an exemplary finger style belt 80. As shown in FIG. 5, belt 80 may include a first pitch 82 hingedly connected to a second pitch 84 via a connecting rod 86. Each pitch of belt 80 may include a zig-zag transverse rib 88. In addition, each pitch may include alternating finger-like protrusions 90, which may include rod receiving apertures 92 configured to receive connecting rod 86.

In some embodiments, links of conveyor belt pitches may include rod retention features configured to prevent undesired removal of connecting rods from assembled conveyor belts. In some embodiments, end links on both right and left lateral edges of the conveyor belt may include rod retaining features. In other embodiments, only selected end links may be provided with rod retaining features. For example, in some embodiments, only right end links or only left end links may be provided with rod retaining features. In some embodiments, all pitches of the belt may have the rod retaining feature on the same edge. In other embodiments, pitches in the belt may alternate as to which edge of the belt, right or left, includes the retention feature. For example, a first pitch may have an end link on the right edge of the belt that includes a rod retention feature, and a second, adjacent pitch may have an end link on the left edge with a rod retention feature, and a third pitch, adjacent the second pitch, may include an end link on the right edge with a rod retention feature, and so on.

Figure 6:
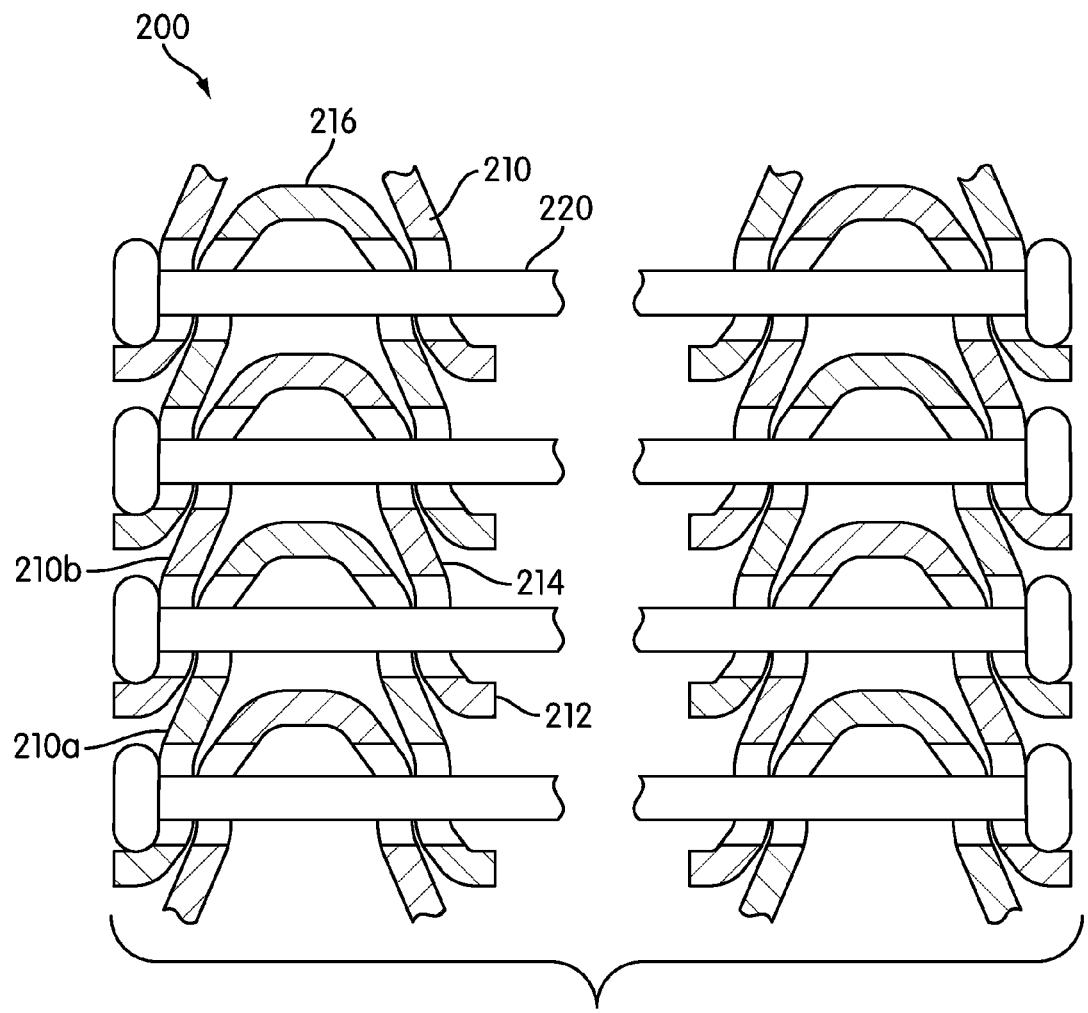
FIG. 6 is an enlarged view of a portion of an exemplary modular conveyor belt.

FIG. 6 illustrates a conveyor belt 200 including rods 220 and links 210 connected to rods 220. Links 210 generally have a substantially U-shaped configuration formed by two substantially longitudinally oriented legs 212, tapered sections 214, and a laterally oriented cross-member 216 between the two legs 212. Legs 212 may include an aperture, such as an elongated aperture, that receives rod 220 and associates links 210 with rods 220.

Legs 212 of links 210 are spaced apart in order to receive the cross-member 216 of an adjacent link. For example, legs 212 of the link 210b are suitably spaced apart to receive cross-member 216 of the link 210a when conveyor belt 200 is in motion. During motion, link 210a may contact link 210b at various contact points, including at points on cross-members 216, on legs 212, and so on.

In some embodiments, links 210 may include provisions for reducing wear of links 210. One way to reduce wear of the links is to select wear resistant materials for the link. However, in some cases, suitable wear resistant materials may lack the tensile strength desired for the links. In contrast, materials with suitable tensile strength often lack the desired wear resistance. Accordingly, in some embodiments, links 210 may be composite links, formed of a supporting structure and a bearing structure. The supporting structure may have a tensile strength that is higher than the tensile strength of the bearing structure, and the bearing structure may be more resistant to wear than the supporting structure.

The configuration of this composite link structure may vary to achieve desired performance characteristics. In some embodiments, the bearing structure may partially enclose or cover the supporting structure. For example, in some cases, the bearing structure may be provided only in areas of the link that are subject to contact with other components of the conveyor belt, such as connecting rods, other links, stationary components of the conveyor frame, and/or moving components of the conveyor drive mechanism. In other embodiments, the bearing structure may completely enclose the supporting structure.

In some embodiments, the bearing structure may be positioned between a connecting rod and a portion of the supporting structure such that longitudinal forces are transmitted from the connecting rod to the supporting structure through the bearing structure. That is, longitudinal forces applied to the link are directed through both the bearing structure and the supporting structure. In some embodiments, the supporting structure may be configured to transmit substantially all tensile forces to which the link is subjected, and the bearing structure may be configured to receive only compressive forces. In other embodiments, the bearing structure may be configured to transmit at least a portion of the tensile forces to which the link is subjected.

In addition, not only may the location of the bearing structure on a link vary, but also, the locations at which composite links are included in a modular conveyor belt may be strategically selected. Turn curve conveyor belts tend to load, in tension, the end of the belt located away from the center of the radius of curvature, whereas the inner end of the belt closest to the center of the radius may experience significantly less loading in tension. Thus, materials with higher tensile strengths may be utilized for links at an outer ends of the conveyor belt. For example, a higher ratio of supporting structure material relative to bearing structure material may be used for outer end links. Similarly, end links also may experience the most wear, as drive and/or guide mechanisms often engage with end links only, and not links located in a central portion of the belt. Therefore, bearing materials may be strategically used more generously in end links.

In addition, the relative sizes of the supporting structure and the bearing structure may vary to achieve desired characteristics. For example, in some embodiments, a volume of the supporting structure may be greater than 50 percent of total volume of the link. In other embodiments, the volume of the supporting structure may be equal to or less than 50 percent of the total volume of the link.

The supporting structure and the bearing structure may be formed of any suitable materials, such as materials having the relative properties mentioned above. For example, the supporting structure and/or the bearing structure may be at least partially formed of steel, brass, aluminum, ceramic, fiber reinforced material, plastic, and/or other suitable materials.

In some embodiments, the supporting structure may be formed of a metal, to provide strength. For example, in some embodiments, the supporting structure may be formed of stainless steel. For instance, in embodiments in which the conveyor belt may be used for food handling processes, the supporting structure may be formed of stainless steel, especially in embodiments where the supporting may be only partially covered by bearing material, and thus, may be exposed to the food. Use of stainless steel may be prevent corrosion of the link, and may also prevent marking of the food by the link materials.

As noted above, in some embodiments, the supporting structure may have a tensile strength that is higher than the tensile strength of the bearing structure, and the bearing structure may be more resistant to wear than the supporting structure. These properties may be achieved by selecting suitable materials, as discussed above. Further, the processes of forming the selected materials and/or treatments of those materials may also contribute to the achievement of these properties. For example, the strength of metals may be augmented by formation processes such as forging, and the strength and/or wear resistance of non-metals may be enhanced by formation processes, such as crosslinking of polymers (plastics). Further, treatments, such as coatings, heat treating, quenching, and other treatments may be used to provide the materials with desired properties. In an exemplary embodiment, the supporting structure may be formed of metal and the bearing structure may be formed of plastic.

The bearing structure may be formed of a plastic material to provide wear resistance. In some embodiments, bearing structure may completely encase the supporting structure. In other embodiments, the bearing structure may only cover select portions of the supporting structure.

The bearing structure may be formed to cover the supporting structure in any suitable way. For example, in some embodiments, the bearing structure may be coated (e.g., dip-coated) over the inner supporting structure. In other embodiments, the two components may be co-molded. For example, the bearing structure may be overmolded over a pre-formed supporting structure. In some embodiments, bearing structure may be affixed to supporting structure using other methods, such as mechanical interlocking features, integrally-molded snap features, and/or fasteners. In some embodiments, the bearing structure may be removably coupled to the supporting structure.

Figure 7:
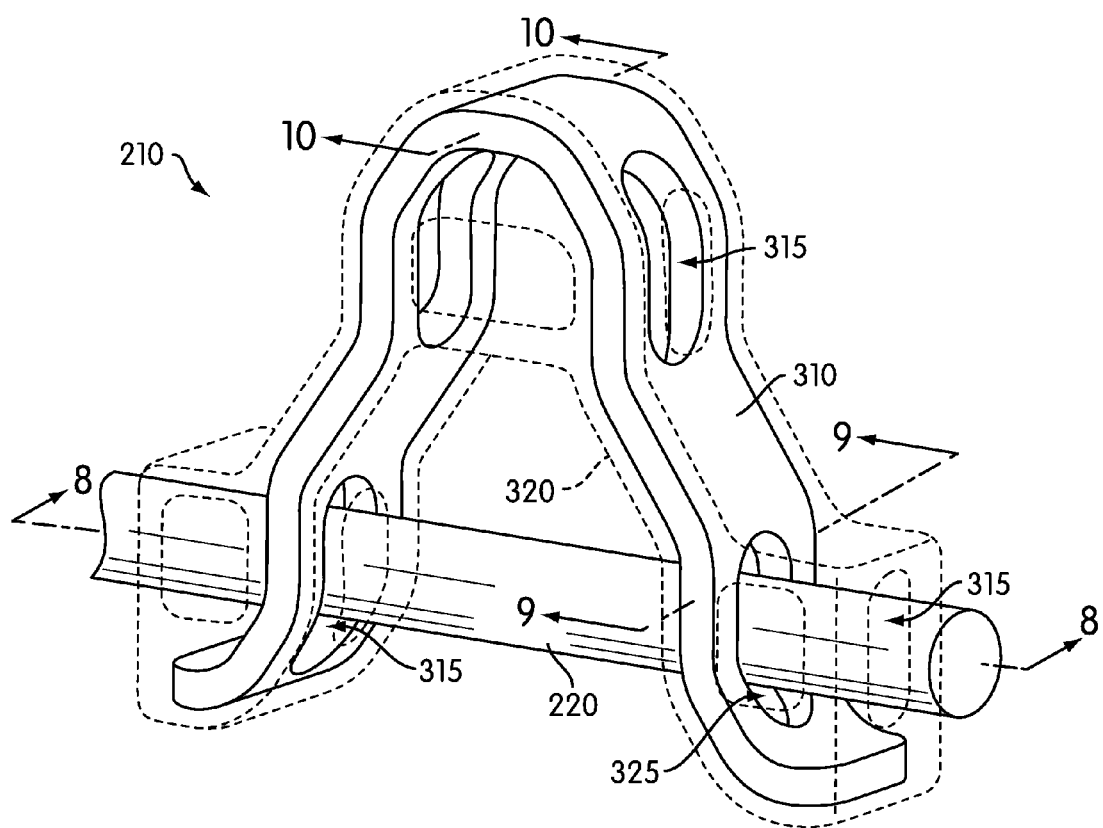
FIG. 7 is a diagram illustrating a perspective view of a composite link.
Figure 8:
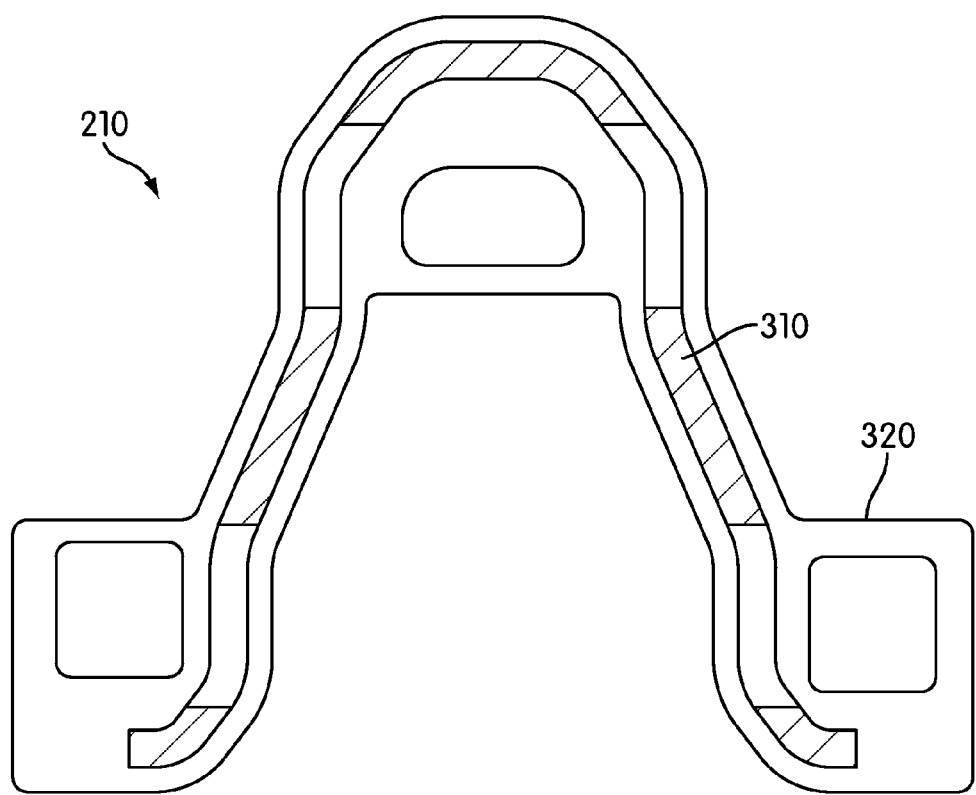
FIG. 8 is a cross-sectional view of the composite link, as defined by section line 8 in FIG. 7.

FIGS. 7-10 illustrate various details of composite link embodiments. As shown in FIGS. 7 and 8, in some embodiments, link 210 may be a composite link 210. For example, in some embodiments, composite link 210 may include a supporting structure 310 and a bearing structure 320. Supporting structure 320 may include a contour that establishes a shape of composite link 210. In addition, supporting structure 310 may include apertures 315 that allow rods 220 from conveyor belt 200 (shown in FIG. 6) to pass through composite link 210. The bearing structure 320 includes apertures 325 that receive rods 220 from conveyor belt 200, allowing rods 220 to pass through composite link 210 and associate with composite link 210. Apertures 315 and apertures 325 may be disposed in longitudinally forward and rearward locations, respectively (i.e., at forward and trailing ends of the link legs). In some embodiments, however, the relative forward/rearward orientation of apertures 315 and 325 may be reversed. Composite link 210 may be formed and/or configured to contact and associate with rods 200 at surfaces of bearing structure 320 that are formed and/or configured to prevent contact between supporting structure 310 and rods 220.

In some embodiments, a composite link may be formed by encasing (or partially encasing) a typical link structure with a bearing structure. For example, it will be noted that the shape of links 210 in FIG. 6 are substantially similar to supporting structure 310 in FIG. 7. In other embodiments, a thinner or otherwise less robust supporting structure may be used, as the bearing structure may provide additional strength such that the combination of the supporting structure and the bearing structure has an overall strength that is comparable to a typical link structure formed of a single material.

As discussed herein, composite links 210 may be utilized by grid style conveyor belts, modular conveyor belts, and/or other conveyor belts known in the art. The size and configuration of composite links 210, such as the type of apertures 325, the shape of legs 212 or cross-members 216, or the shape of composite link 210 itself, may vary according to the type of conveyor belt. For example, composite link 210 may be utilized by a turn curve belt, a straight running belt, a belt with steel rods, a belt with plastic rods, and so on. Thus, composite link 210, including supporting structure 310 and/or bearing structure 320, may be adapted based on its intended use, among other things.

Figure 9:
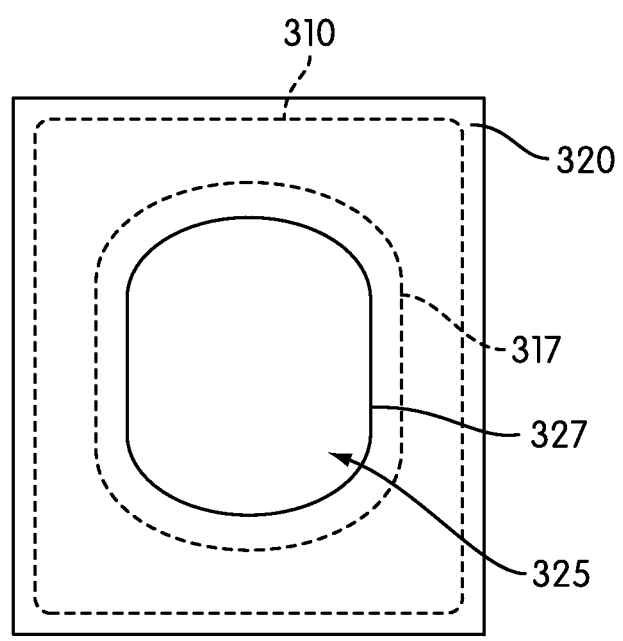
FIG. 9 is a cross-sectional view of the composite link, as defined by section line 9 in FIG. 7.
Figure 10:
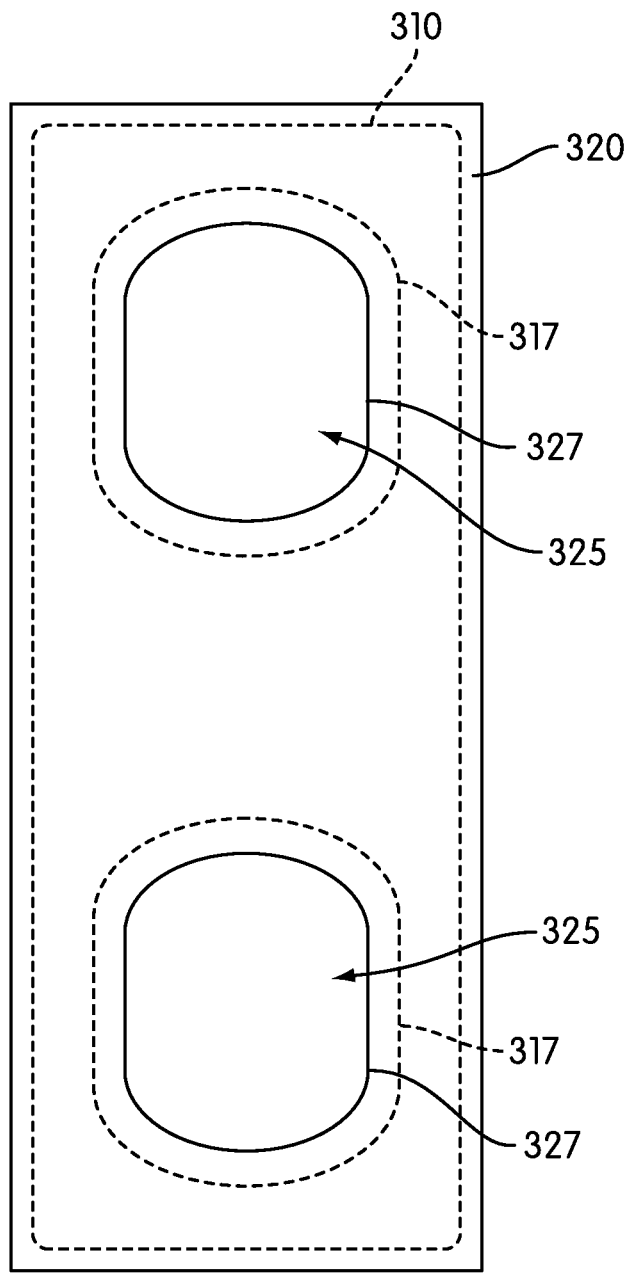
FIG. 10 is a cross-sectional view of the composite link, as defined by section line 10 in FIG. 7.

In some embodiments, composite link 210 only contacts rod 220 at surfaces covered by bearing structure 320. For example, in some embodiments, only select surfaces of supporting structure 310 may be overmolded with bearing structure 320. As shown in the cross-sectional views of FIGS. 9 and 10, an aperture 325 defined by a plastic surface 327 of bearing structure 320 is the only surface available to receive and make contact with rod 220 of conveyor belt 200. As shown in FIG. 9, an engagement surface 317 of supporting structure 310 may define at least part of the aperture 325. Further, as also shown in FIG. 9, in some embodiments, bearing structure 320 may cover engagement surface 317 and may provide a contact surface 327 configured to contact a connecting rod inserted within aperture 325. Thus, bearing structure 320 may prevent the connecting rod from contacting engagement surface 317.

For example, in some embodiments, a steel, U-shaped metal link may be encased with a suitable plastic material. The steel, providing the shape and support to rods engaged with the link, does not contact the supported rods, because the plastic is placed between the metal rods and the metal link. The plastic inhibits the metal link from wearing down due to frictional forces between the metal rod and the metal link during operation of a conveyor belt. Additionally, the plastic inhibits the metal link from wearing down due to contact with other links (such as links adjacent to the metal link), contact with a drum that drives the conveyor belt, or other components of the conveyor belt that may contact a link, such as framework structure of the conveyor.

As discussed herein, composite links 210, supporting structures 310, and/or bearing structures 320 may be configured in a variety of ways. Further, composite links 210 may be manufactured or formed using a variety of processes known in the art. In some embodiments, supporting structure 310 may be formed by casting (such as die casting, centrifugal casting, shell casting, sand casting, and so on), plastic deforming, sheet metal forming, forging, stamping, machining, and so on. Once substantially formed, metal connecting structure 310 may be machined, or further machined, to achieve a desired shape.

Figure 11:
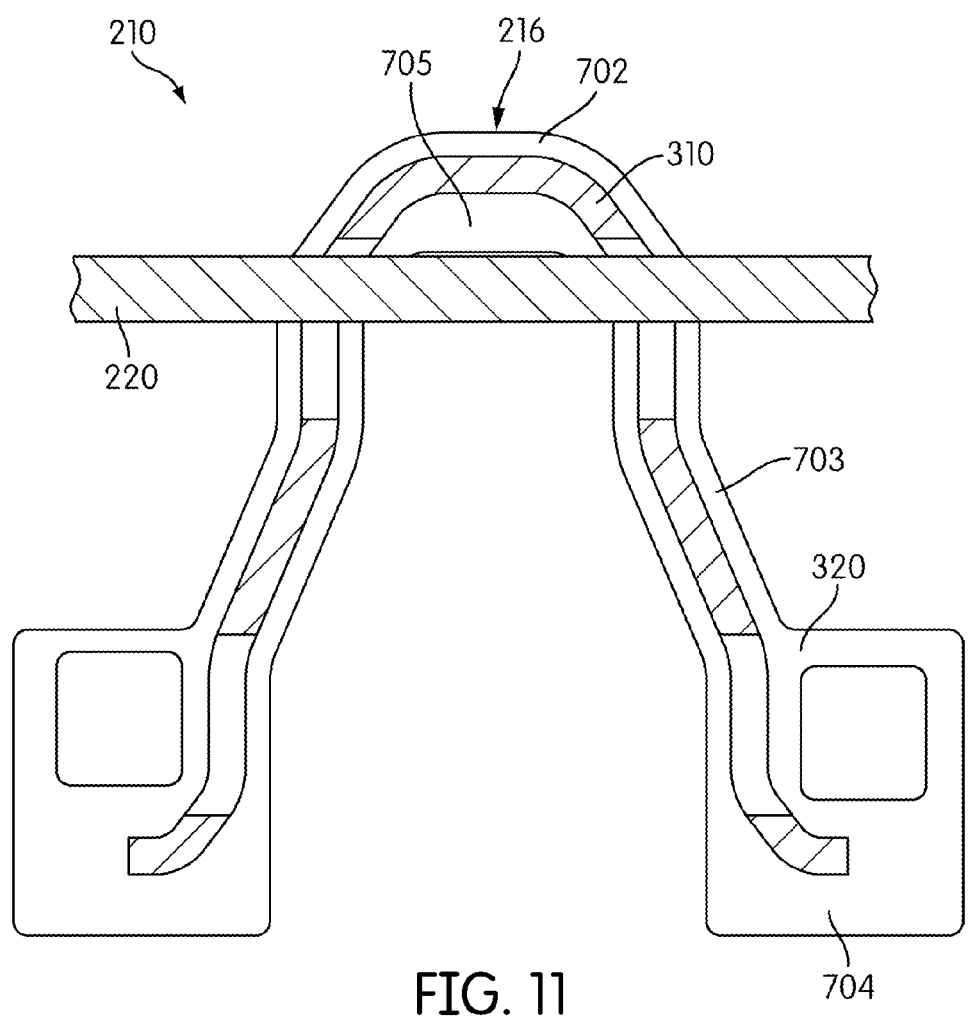
FIG. 11 is a diagram illustrating a top plan view of a further configuration of the composite link.

Bearing structure 320 may be formed over supporting structure 310 in any suitable way. In some embodiments, bearing structure 320 may completely cover supporting structure 310. In some embodiments, bearing structure 320 may be molded over only surfaces of supporting structure 310 that contact other components of conveyor belt 200. For example, bearing structure 320 may include plastic material molded over a surface in contact with a rod, a surface in contact with another link, a surface in contact with a drum, and so on. For example, while bearing structure associated with apertures 325 is discussed above, bearing structure may also be provided at further rod contacting surfaces, such as the engagement surface of the supporting structure defining at least part of cross-member 216, as shown in FIG. 11.

In some embodiments, the thickness of bearing structure 320 may vary from one section of the link to another. FIG. 11 depicts composite link 210 having relatively thick bearing structure sections, such as a thick lower cross-member section 705 and a thick lower leg section 704, and relatively thin sections, such as a thin tapered section 703 and a thin upper cross-member section 702. In some cases, composite link 210 may have relatively thick sections at locations where link 210 contacts other components of conveyor belt 200, and may have relatively thin sections where link 210 does not contact other components of the belt 200. In some cases, the volume of the metal may be larger than the volume of the plastic at some or all sections of composite link 210, in order to prevent wear without sacrificing strength. The specific ratio may be dependent on the type of conveyor belt 200 used, the type of materials used as supporting structure 310 and/or bearing structure 320, or other factors. For example, the ratio may depend on certain failure characteristics of composite link 210, such as on a ratio that prevents complete failure of the link when either supporting structure 310 or bearing structure 320 fails.

In some cases, the thickness may be defined based on an analysis of historical data associated with the wear of previously used links. For example, the analysis may determine that composite link 210 is more likely to break down due to wear at the cross-member than any other section of link 210, for example due to wear from contact with rod 220 with cross-member 216. Using the analysis, the thickness of lower cross-member section 705 of bearing structure 320 may be larger than the thickness at upper cross-member section 702.

In some embodiments, at least one of the supporting structure and the bearing structure may comprise one continuous segment of the link. For example, in some embodiments, the bearing structure may be a unitary piece of material, as shown in FIG. 11.

Figure 12:
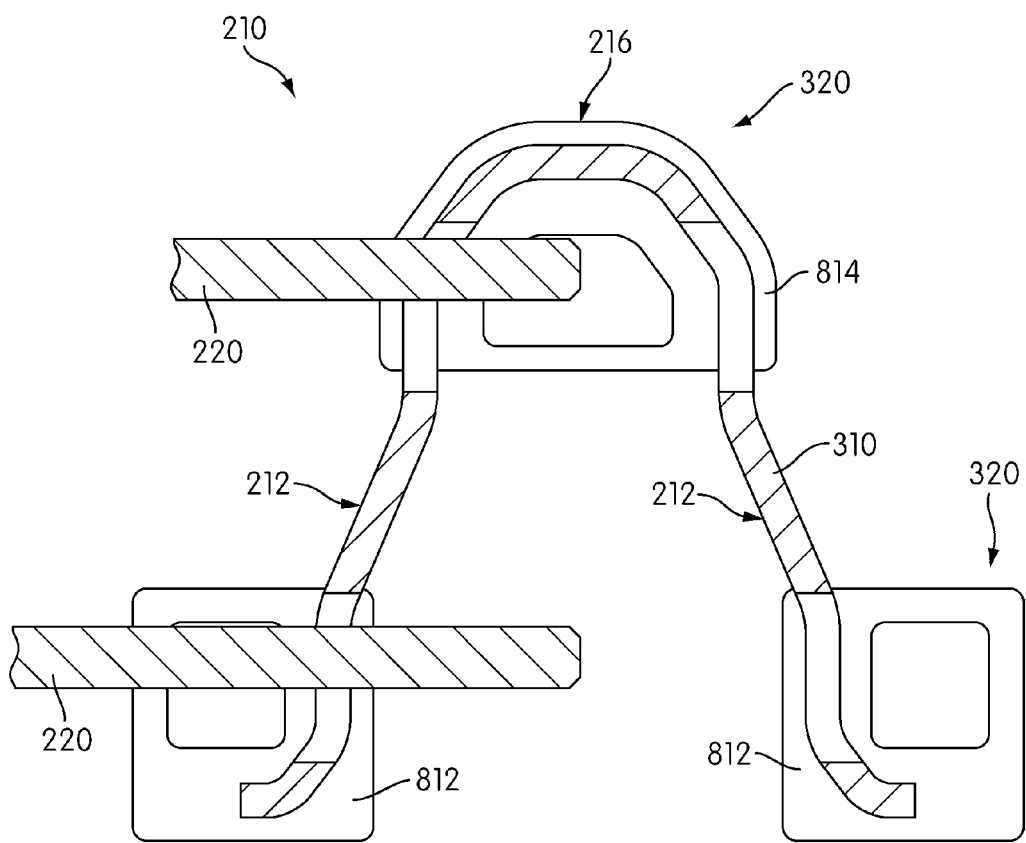
FIG. 12 is a diagram illustrating a top plan view of a further configuration of the composite link.

In other embodiments, however, at least one of the supporting structure and the bearing structure may comprise two or more discontinuous segments of the link. For example, in some embodiments, bearing structure 320 may be formed as multiple distinct pieces that cover sections of supporting structure 310 that contact rods 220 or other links. FIG. 12 depicts composite link 210 that includes multiple bearing structures 320 located at sections of link 210 that receive rods 220. For purposes of illustration, rods 220 are shown in FIG. 12 in partially inserted configurations. Legs 212 of link 210 include a covering of first sections 812 of bearing structure 320, and cross-member 216 of link 210 includes a covering of a second section 814 of bearing structure 320. In some embodiments, bearing structure 320 may be utilized to engage and retain rod 220 at link 210. Such a configuration is discussed in greater detail below.

Figure 13:
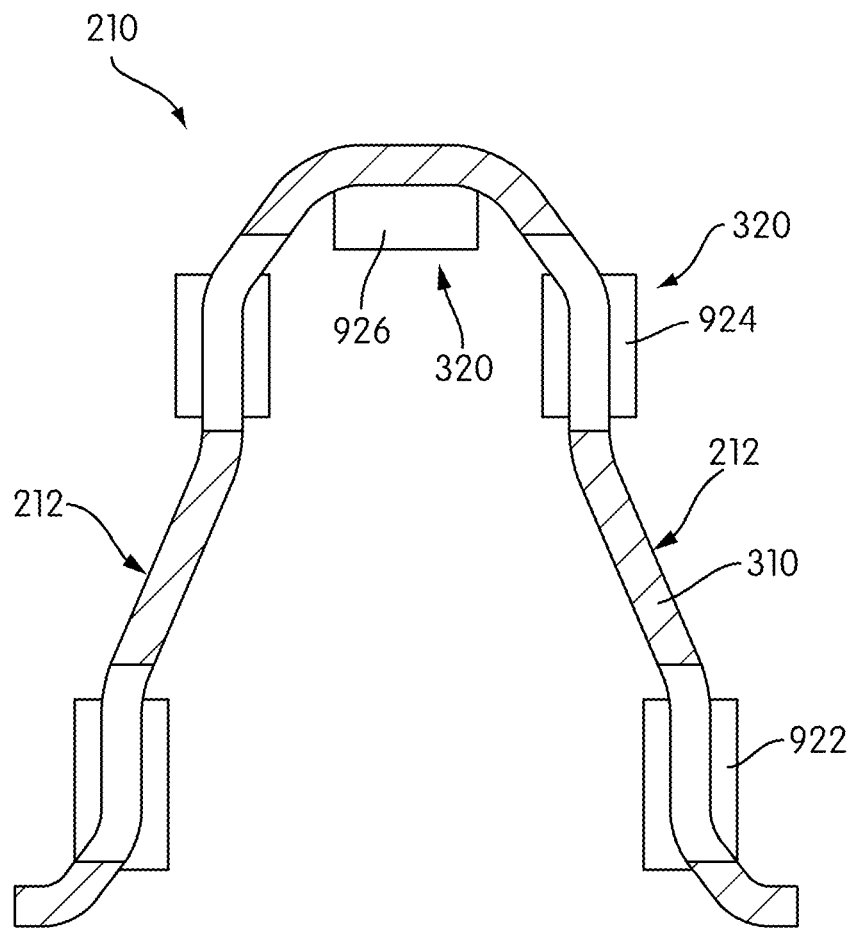
FIG. 13 is a diagram illustrating a top plan view of a further configuration of the composite link.
Figure 14:
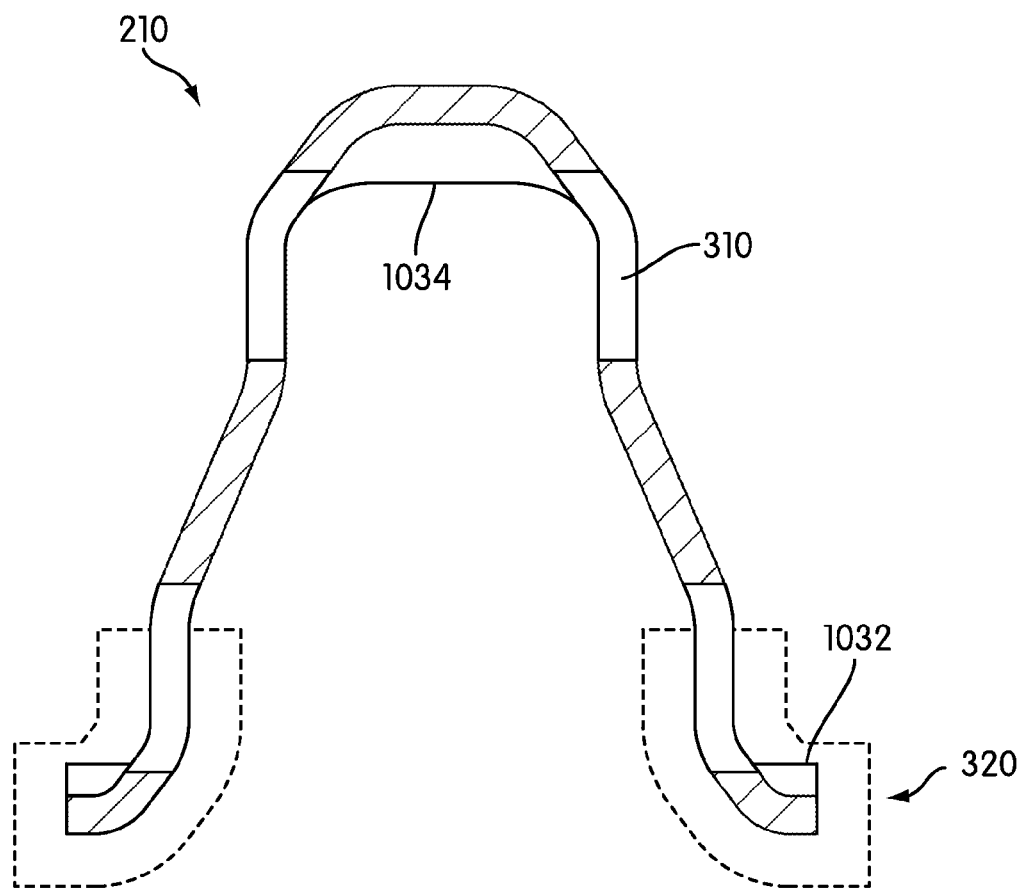
FIG. 14 is a diagram illustrating a top plan view of a further configuration of the composite link.

FIGS. 13 and 14 depict composite links 210 that include bearing structures 320 having multiple sections at various engagement surfaces of supporting structures 310. Composite link 210 of FIG. 13 includes sections 922 and 924 of bearing structure 320 that cover apertures within legs 212 of supporting structure 310 as well as a section 926 that covers cross-member 216 of supporting structure 310. Composite link 210 of FIG. 14 includes sections of bearing structure 320 that cover engagement surfaces of supporting structure 310, such as a cross-member cover section 1034 and a leg cover section 1032.

In some embodiments, the bearing structure may be configured to prevent conveyor belt components from contacting engagement surfaces of the supporting structure that are configured to engage a received or retained connecting rod. This configuration may enable a reduced amount of material to be used for the bearing structure, which may limit costs and weight.

Figure 15:
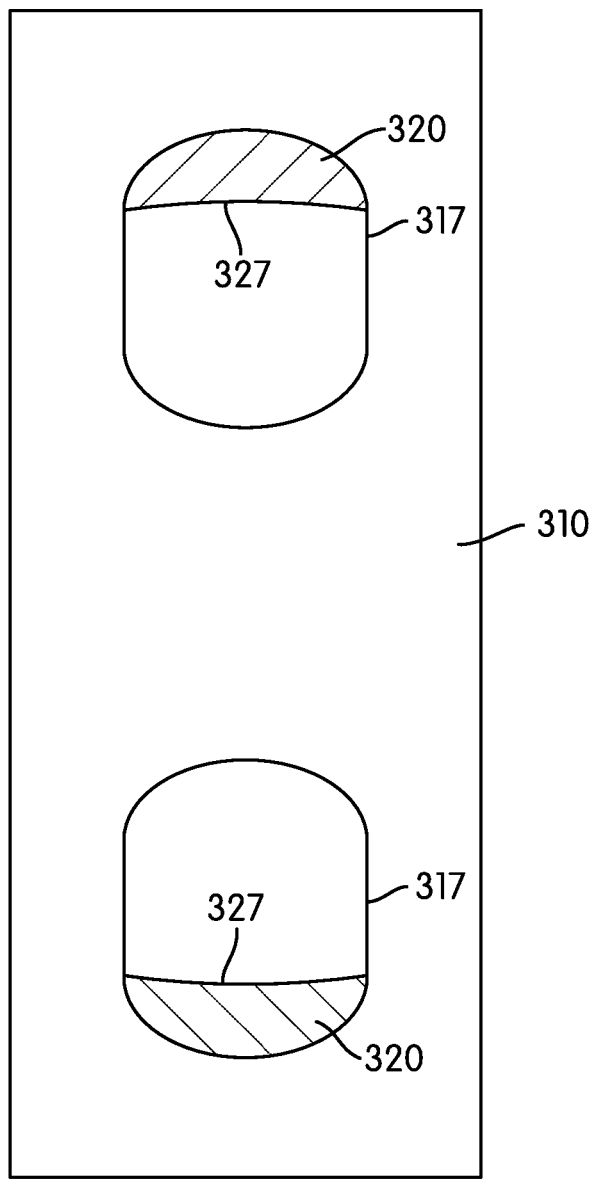
FIG. 15 is a cross-sectional view of a further configuration of the composite link.

FIG. 15 depicts composite link 210 having bearing structures 320 located only at surfaces of supporting structure 310 that engage a received or retained rod 220. Contact surfaces 327 of bearing structures 320 may be configured or adapted to receive and retain rod 220, providing a secure, reliable connection between composite link 210 and rod 220 while preventing or reducing the wear on composite link 210 due to the connection with rod 220, among other things. In some embodiments, bearing structure 320 may be retained on supporting structure 310 by connecting rod 220.

Figure 16:
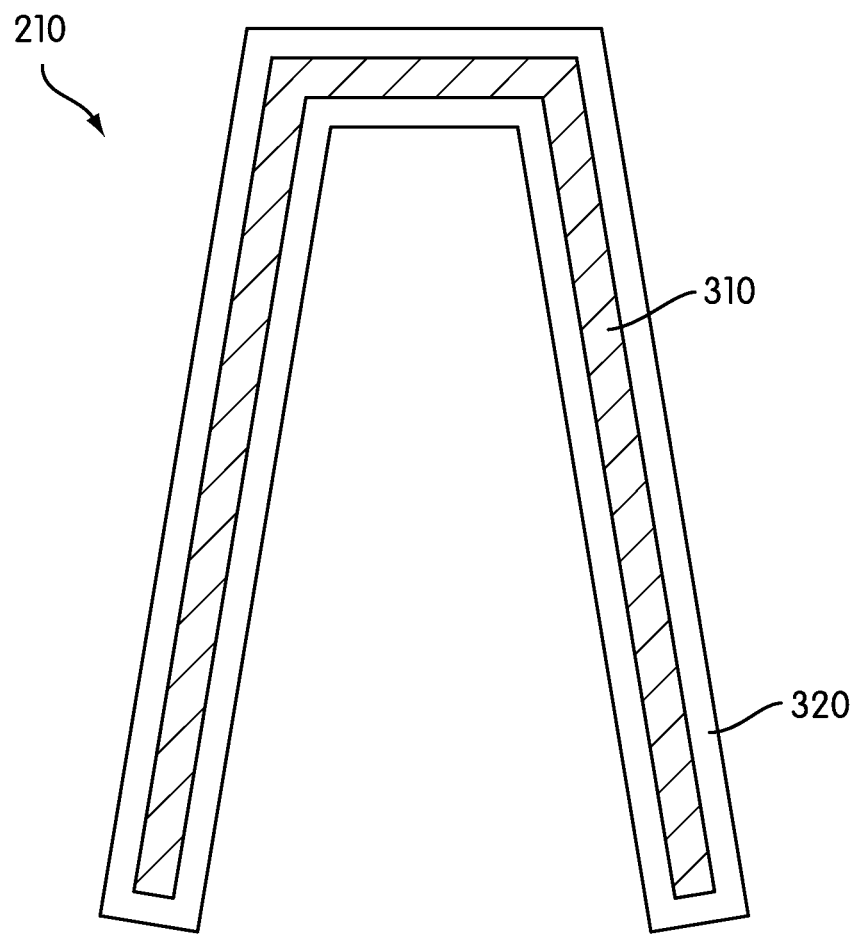
FIG. 16 is a diagram illustrating a top plan view of a further configuration of the composite link.
Figure 17:
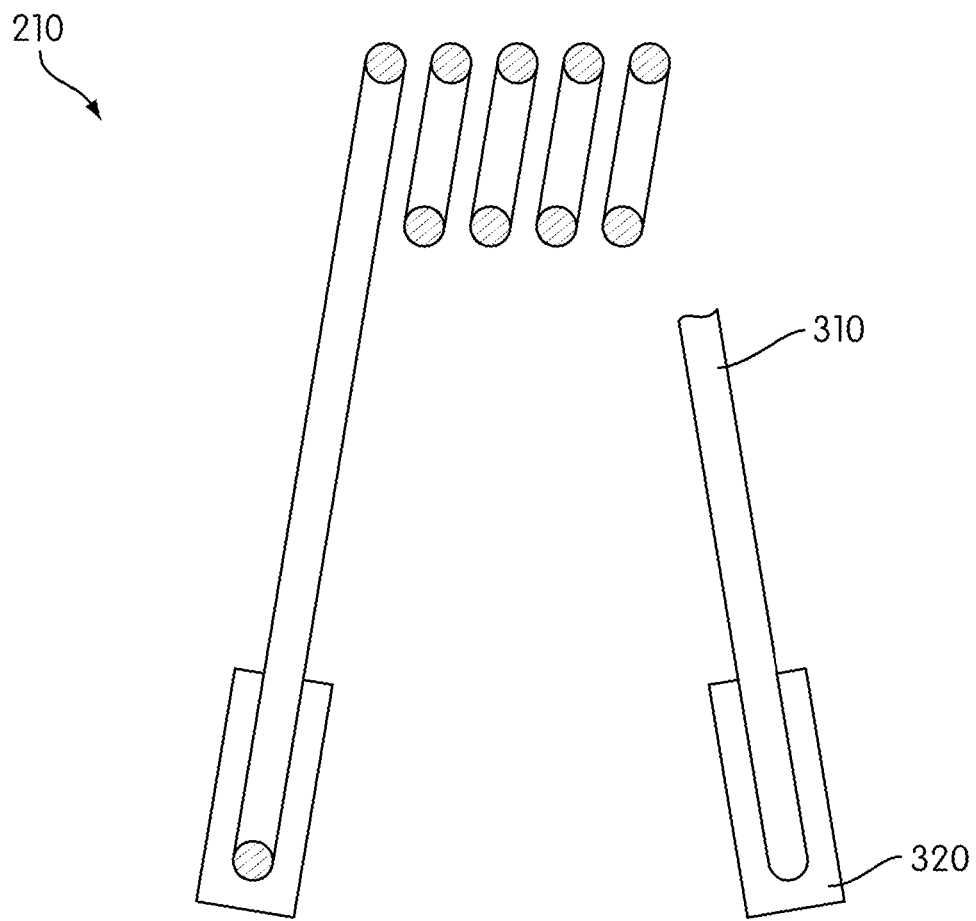
FIG. 17 is a diagram illustrating a top plan view of a further configuration of the composite link.
Figure 18:
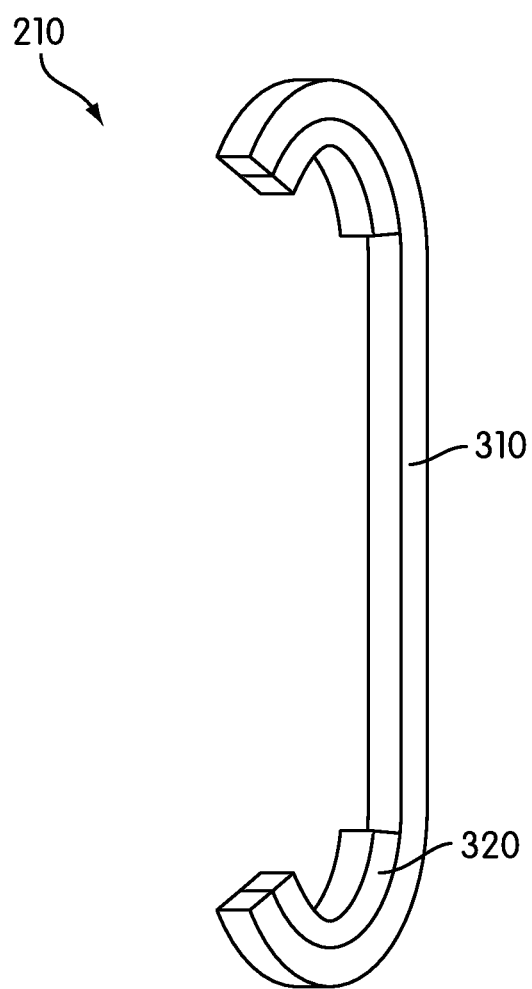
FIG. 18 is a diagram illustrating a perspective view of a further configuration of the composite link.
Figure 19:
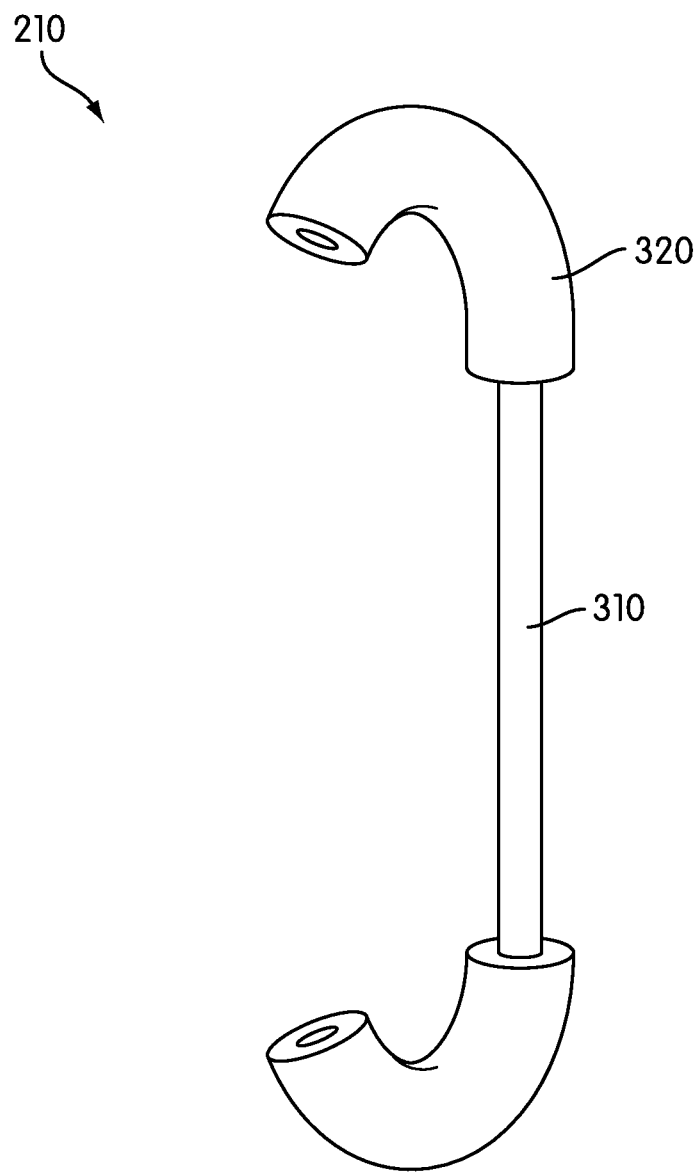
FIG. 19 is a diagram illustrating a perspective view of a further configuration of the composite link.

Supporting structure 310 may also be formed in a variety of configurations, depending on the characteristics of a conveyor belt and/or the utilization of composite link 210. FIG. 16 depicts composite link 210 having a flat sheet configuration, including supporting structure 310 encased within bearing structure 320. FIG. 17 depicts composite link 210 having a round wire configuration, including supporting structure 310 and multiple bearing structures 320. FIG. 18 depicts composite link 210 having a single longitudinal member with hooks at either end to engage rod 220, including supporting structure 310 and multiple bearing structures 320. FIG. 19 depicts composite link 210 having a single longitudinal member with loops at either end to engage rod 220, including supporting structure 310 and multiple bearing structures 320. As will be readily apparent to those skilled in the art, other configurations, shapes, forms, and so on, may be utilized as a composite link 210. For example, the supporting structure 310 may include multiple steel links attached or formed together, may include alternating metal and plastic links, and so on.

Figure 20:
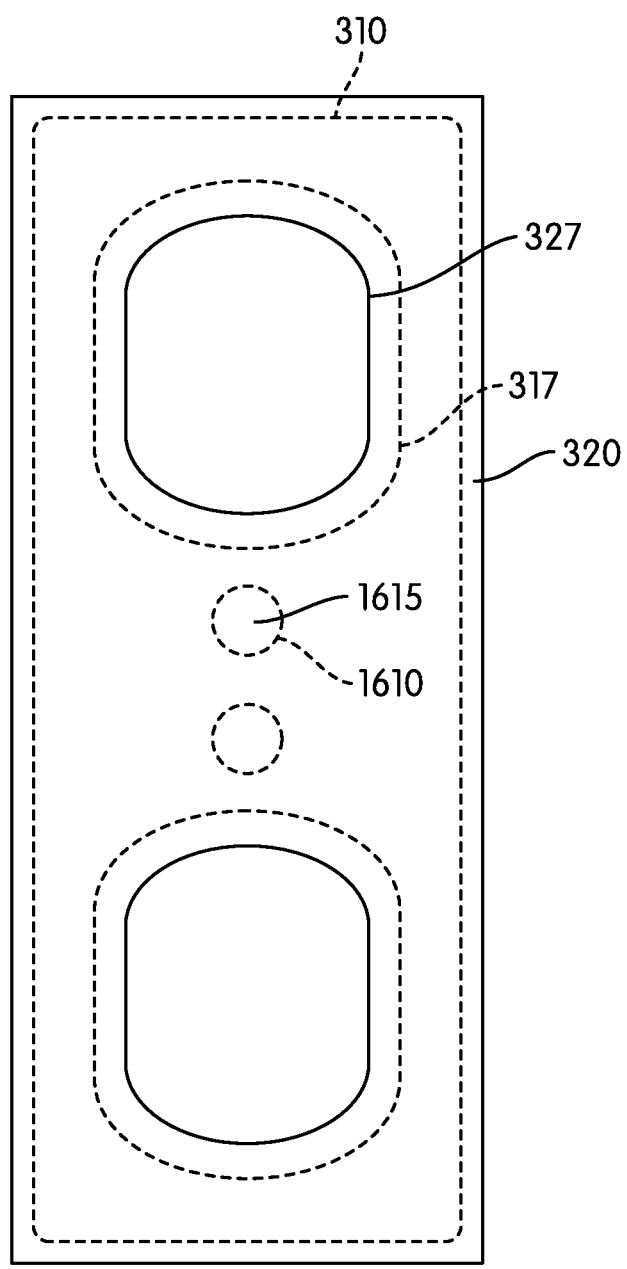
FIG. 20 is a diagram illustrating a cross-sectional view of a further configuration of the composite link.

In some embodiments, supporting structure 310 may include features that facilitate or strengthen the attachment between supporting structure 310 and bearing structure 320. FIG. 20 depicts composite link 210 that includes attachment holes 1610 in supporting structure 310 capable of receiving plugs or extensions 1615 of bearing structure 320. Plugs 1615 may facilitate attaching bearing structure 320 to supporting structure 310 via holes 1610, providing more bond strength between the structures, among other benefits. As will be apparent to those skilled in the art, other attachment mechanisms may be employed when assembling composite links 210. For example, bearing structure 320 may be mechanically assembled to supporting structure 310.

Figure 21:
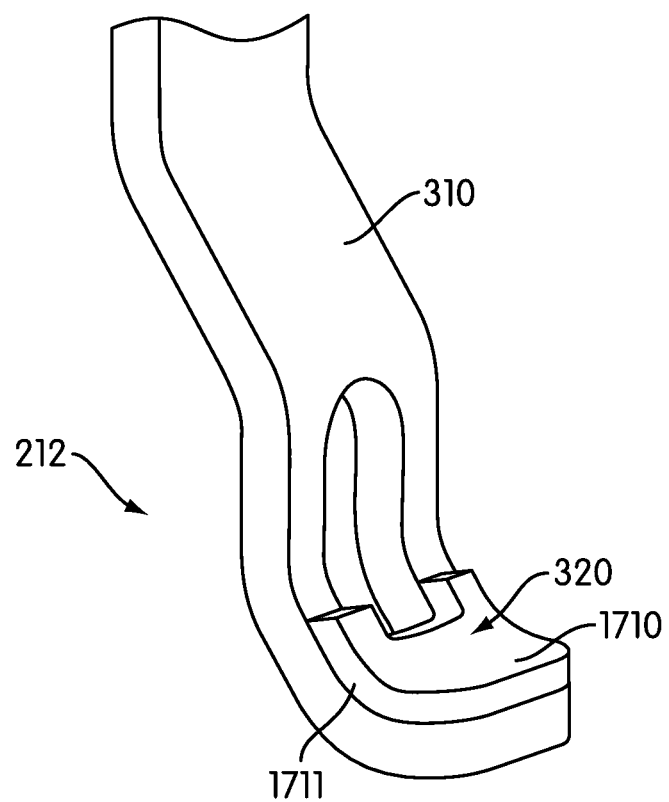
FIG. 21 is a diagram illustrating a perspective view of a further configuration of the composite link.
Figure 22:
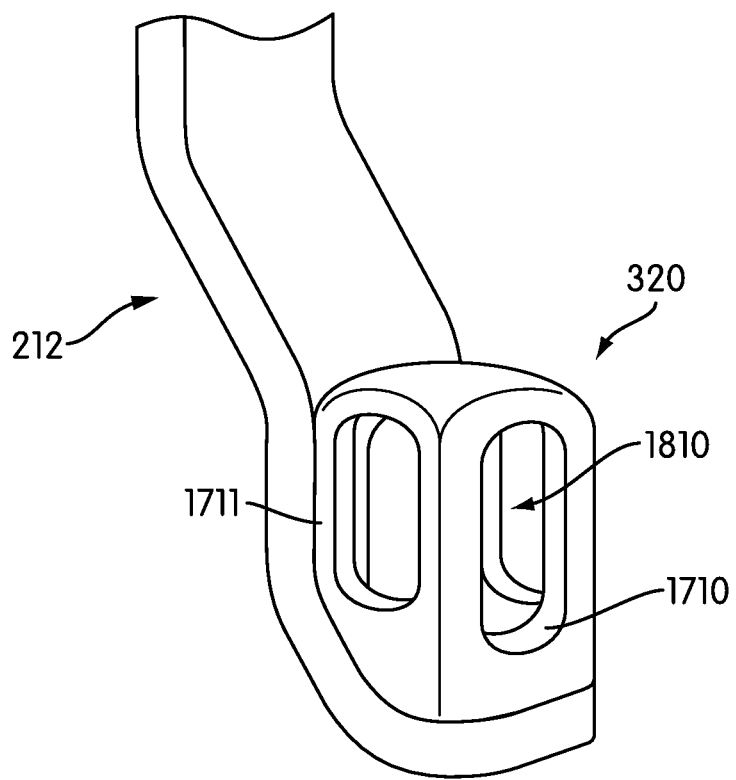
FIG. 22 is a diagram illustrating a perspective view of a further configuration of the composite link.

In some embodiments, bearing structure 320 is produced as a separate component and is subsequently attached to supporting structure 310. FIGS. 21 and 22 depict bearing structures 320 as separate components. In FIG. 21, bearing structure 320 includes a leg coupling portion 1711 configured to couple to leg 212 of supporting structure 310, and a rod retaining portion 1710 capable of receiving and retaining rod 220 for link 210. Rod 220 may hold bearing structure 320 in place at leg 212 of supporting structure 310. In FIG. 22, bearing structure 320 is also formed as a separate component and includes leg coupling portion 1711, rod retaining portion 1710, and an aperture 1810. Thus, bearing structure 320 may be removably attachable to leg 212 of supporting structure 310.

Figure 23:
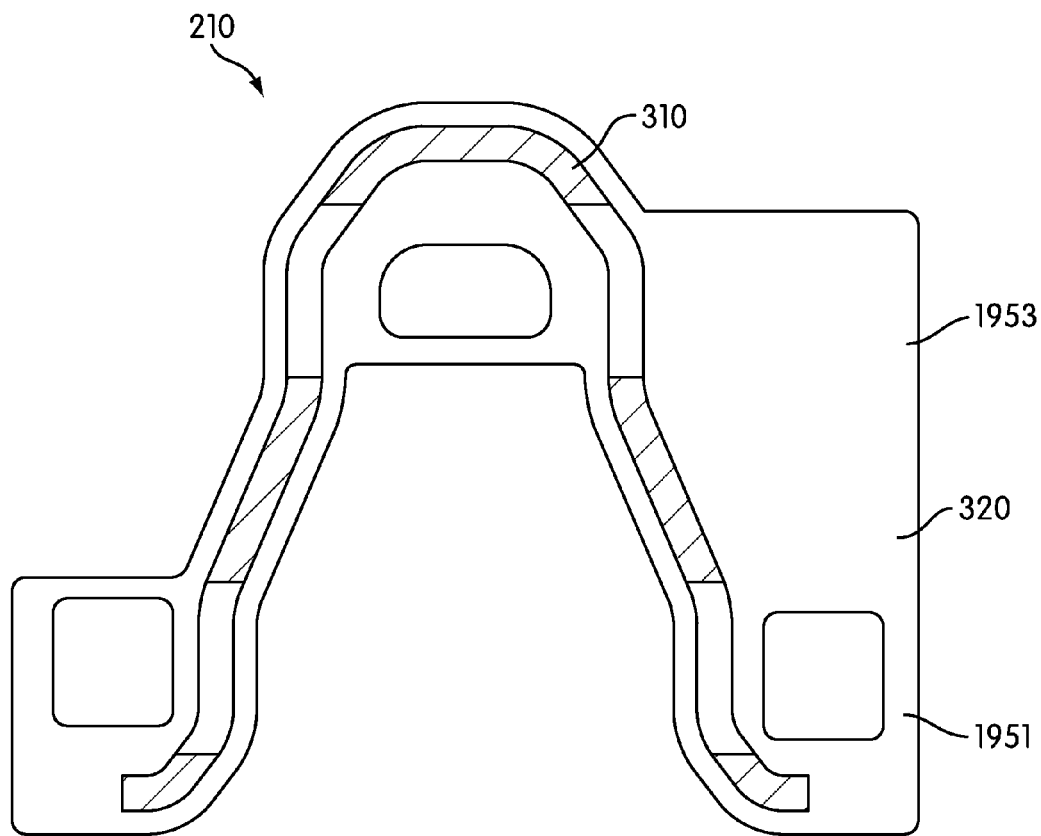
FIG. 23 is a diagram illustrating a cross-sectional view of a further configuration of the composite link.

In some embodiments, the bearing structure 320 includes portions or sections utilized as certain components of conveyor belt 200. FIG. 23 depicts composite link 210 having bearing structure 320 that includes a rod retaining portion 1951 used to receive and retain rod 220, and a contact surface portion 1953 used to reduce the friction between a belt and other components of a conveyor system.

Figure 24:
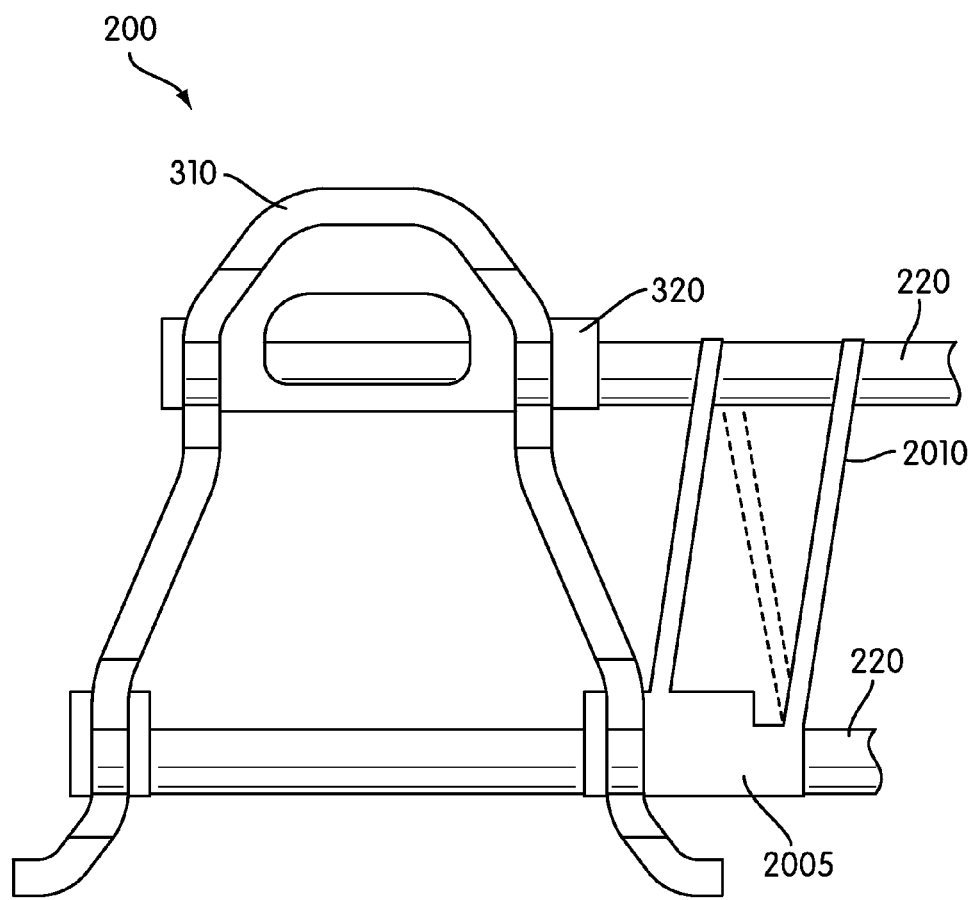
FIG. 24 is a diagram illustrating a cross-sectional view of a further configuration of the conveyor belt.

In some embodiments, at least one of the supporting structure and the bearing structure may comprise a portion of a product support surface attached to the link. For example, FIG. 24 depicts composite link 210 having bearing structure 320 that includes a rod retaining portion 2005 used to receive and retain rod 220, and a mesh portion 2010 that acts as a portion of a center mesh for conveyor belt 200, such as for brick-laid construction. That is, composite link 210 may include a first portion 2005 that acts to link or otherwise associate rods 220 of conveyor belt 200 together and to the links 210, and a second portion 2010 that acts as a mesh or netting configured to support wares being carried by the conveyor belt, and prevent smaller pieces of carried items from falling between rods 220. In some embodiments, although second portion 2010 may be part of composite link 210, second portion 2010 may be provided without any of supporting structure 310.

Figure 25:
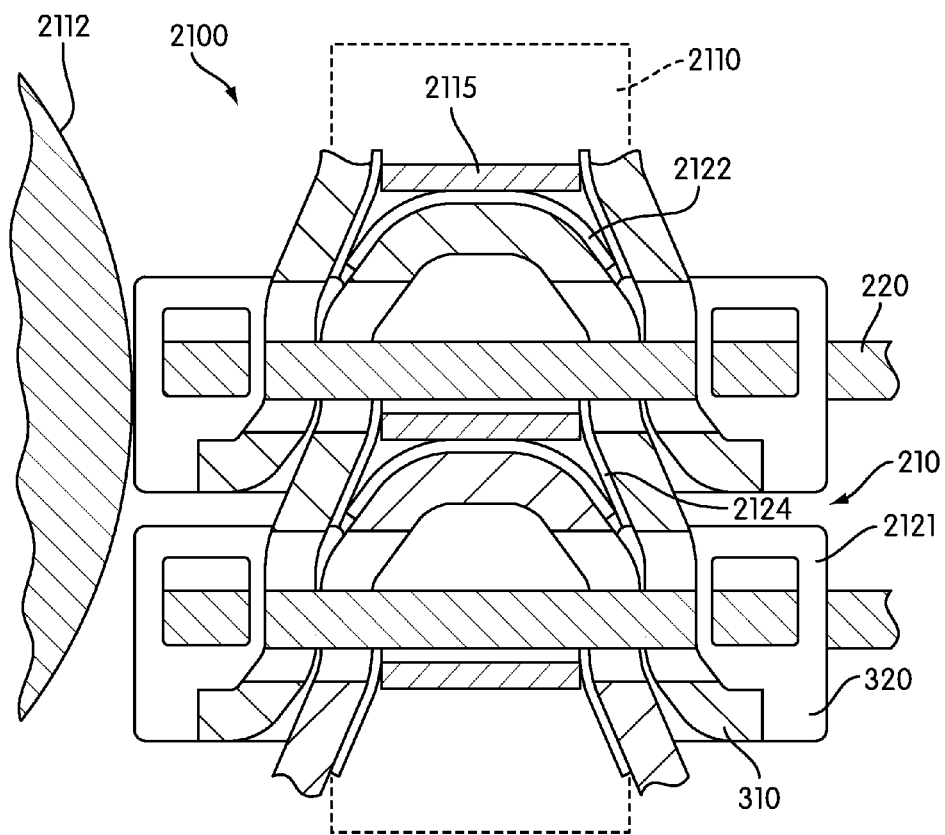
FIG. 25 is a diagram illustrating a cross-sectional view of a further configuration of the conveyor belt.

FIG. 25 depicts an embodiment of a turn curve conveyor belt 2100, including composite links 210, associated rods 220, and a sprocket 2110 utilized as a driving mechanism for conveyor belt 2100. Sprocket 2110 includes teeth 2115 that, when sprocket 2110 is turning, contact links 210 and provide force to drive links 210 and rods 220. Links 210 include supporting structure 310 and one or more bearing structures 320. For example, links 210 include rod contact surfaces 2121, upper tooth contact surfaces 2122, and lower tooth contact surfaces 2124. Thus, composite link 210 utilizes supporting structure 310 to associate rods 220 of belt 2100, and utilizes plastic bearing surfaces 320 to protect supporting structure 310 when in contact with other components of belt 2100, such as sprocket 2110 and/or rods 220.

As will be recognized by those in the art, in some embodiments the conveyor belt may be driven and/or guided by a drum 2112. In some embodiments, drum 2112 may be a friction-based drum. In such embodiments, the surface of the drum 2112 may have a coefficient of friction high enough to engage with the edge links of a belt without interconnecting or interdigitating with the drum. Sprocket-driven and drum-driven belts are discussed in greater detail in U.S. Pat. No. 5,141,102, entitled "Conveyor Belt and System with a Non-collapsing Inside Edge," the entire disclosure of which is incorporated herein by reference. In some embodiments, drum 2112 may have an elastomeric surface or have a pliable surface coated with a substance that increases tackiness of the surface. In such cases, the plastic bearing surfaces described above may not only inhibit the wear of the edge links, but may also provide a more secure engagement between the edge link and the drum surface.

As will be recognized by those in the art, conveyor belt 200, composite link 210, bearing structure 320, and/or supporting structure 310 may be formed in a variety of ways not specifically discussed herein. For example, the bearing structure 320 may include sections that facilitate attachment to rod 220, allowing rod 220 to directly engage with a metal link, or bearing structure 320 may prevent wear between a button-head 32 and supporting structure 310, and so on.

As will be apparent to one skilled in the art, composite links 210 described herein may be formed of materials other than metal and plastic. For example, composite link 210 may employ other materials as a supporting structure, such as certain plastics, wood, ceramics, and so on. Likewise, composite link 210 may employ various materials as a bearing structure, such as ceramics, resins, fabrics, and so on.

The features discussed herein may be used in many different types of conveyor belts and may be combined with other technologies intended to simplify the manufacturing of conveyor belts. For example, the composite link concepts mentioned above may be combined with rod receiving aperture alignment features to both ease proper aligning of rod receiving apertures and insertion of the rod and, further, securely retain the connecting rods once inserted.

While various embodiments of the current embodiments have been described, the description is intended to be exemplary, rather than limiting and it will be apparent to those of ordinary skill in the art that many more embodiments and implementations are possible that are within the scope of the current embodiments. Accordingly, the current embodiments are not to be restricted except in light of the attached claims and their equivalents. Features of any embodiment described in the present disclosure may be included in any other embodiment described in the present disclosure. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to a method and/or process should not be limited to the performance of their steps in the order written, and one skilled in the art can readily appreciate that the sequences may be varied.

Figure 26:
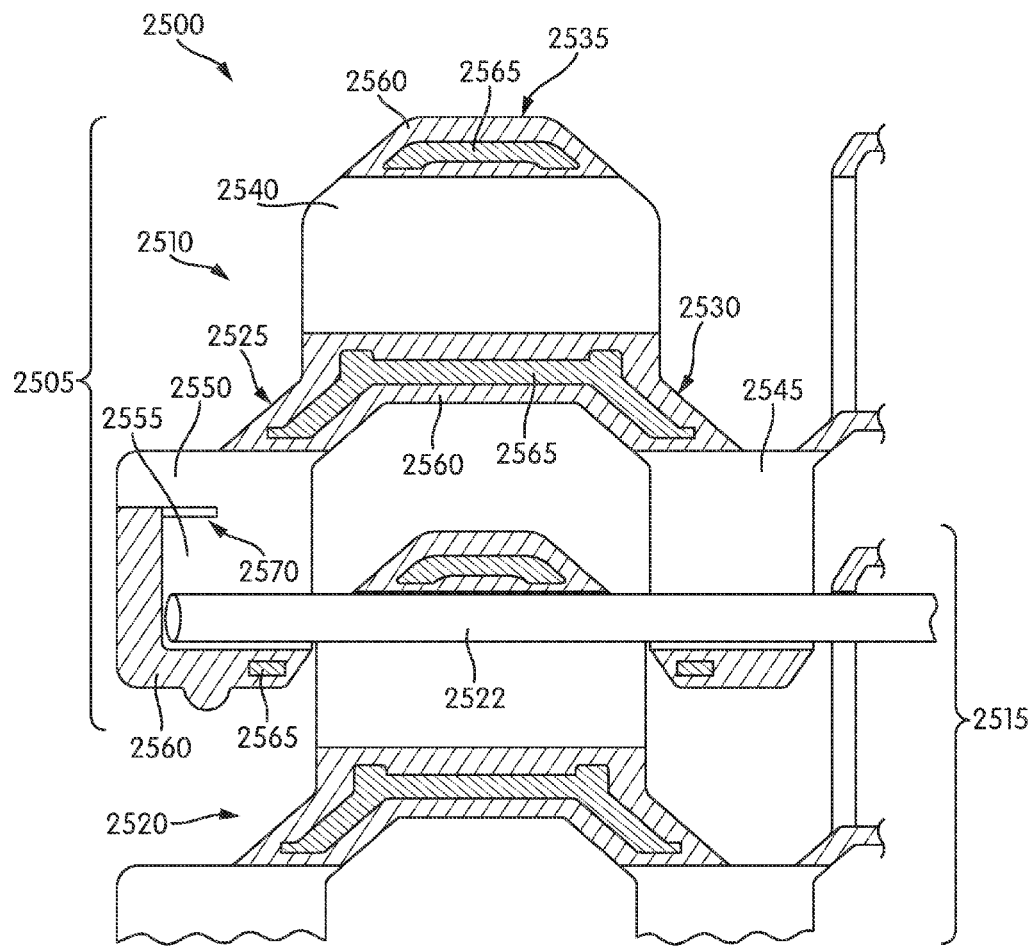
FIG. 26 is a cross-sectional view of a conveyor belt including composite links.

FIG. 26 illustrates another embodiment of a modular conveyor belt 2500. As illustrated in FIG. 26, conveyor belt 2500 may include a first pitch 2505, which may include a first link 2510. Conveyor belt 2500 may further include a second pitch 2515, which may include a second link 2520. First link 2510 and second link 2520 may be connected (e.g., hingedly connected) by a connecting rod 2522. As shown in FIG. 26, in some embodiments, the links of adjacent pitches may have substantially identical structures. Accordingly, first link 2510 may have a substantially identical structure as second link 2520. Therefore, for purposes of discussion, only first link 2510 will be described in detail. It should be noted that first pitch 2505 and second pitch 2515 are shown in FIG. 26 as having unitary structures, each comprised of plurality of links. In some embodiments, however, the links of each pitch may be individual components that are disposed laterally across the connecting rods, and thus, the links may rotate about the connecting rods relative to one another.

As with other embodiments discussed above, first link 2510 may have a substantially U-shaped configuration, including an outer leg 2525, and inner leg 2530, and a cross-member 2535 between outer leg 2525 and inner leg 2530. First link 2510 may further include a forward aperture 2540, an inner rearward aperture 2545, and an outer end aperture 2550. Apertures 2540, 2545, and 2550 may be configured to receive connecting rods 2522.

In some embodiments, first link 2510 may include a bearing structure 2560 and a supporting structure 2565. Bearing structure 2560 and supporting structure 2565 may have characteristics and materials that are the same or similar to the bearing structures and supporting structures discussed above.

As shown in FIG. 26, first link 2510 may be an end link and may include a rod retaining feature formed by at least one of the bearing structure and the supporting structure. For example, as shown in FIG. 26, first link 2510 may include a rod recess 2555 configured to house a free end of connecting rod 2522 once fully inserted. In order to retain rod 2522 within recess 2555 and prevent rod 2522 from withdrawing from outer end aperture 2550, first link 2510 may include a rod retaining ridge 2570 proximate outer end aperture 2550. Rod retaining ridge 2570 may be defined, at least in part, by bearing structure 2560. Rod retaining ridge 2570 may include a laterally oriented ridge configured to inhibit the longitudinal translation of the connecting rod.

Figure 27:
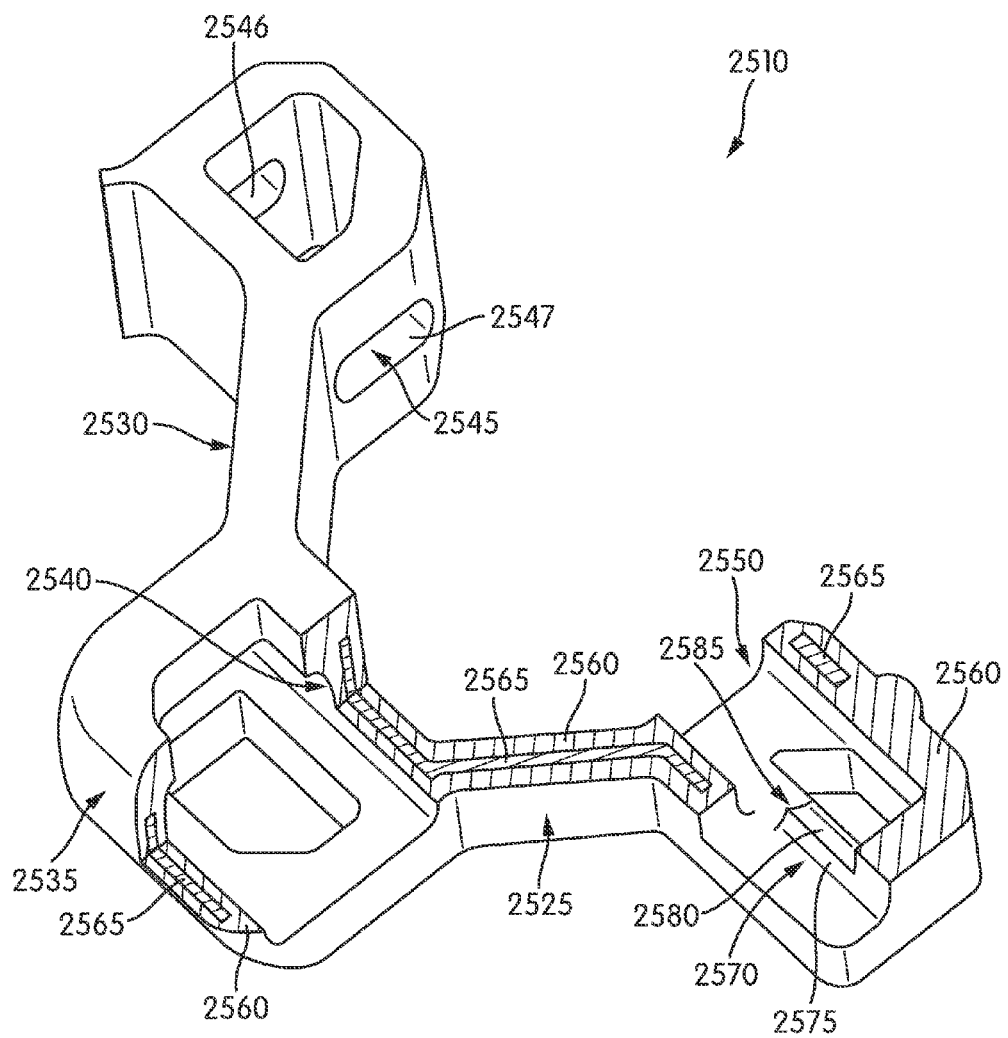
FIG. 27 is a diagram illustrating a perspective, cut-away, partial cross-sectional view of a composite link from the conveyor belt shown in FIG. 26.

FIG. 27 is a perspective, cut-away, partial cross-sectional view of first link 2510. The inner end of first link 2510 is illustrated in FIG. 27 in a truncated fashion. However, in some embodiments, first link 2510 may have a substantially similar form as a stand alone, individual link.

FIG. 27 also shows additional detail regarding rod retaining ridge 2570. In some embodiments, rod retaining ridge may have the form of a detent. For example, as shown in FIG. 27, rod retaining ridge 2570 may include a sloped forward wall 2575 and a sloped rearward wall 2580. As shown in FIG. 27, forward wall 2575 and rearward wall 2580 may have a concave curvature. In other embodiments, forward wall 2575 and/or rearward wall 2580 may have a relatively planar configuration or a convex configuration. Further, in some embodiments, ridge 2570 may have a substantially semicircular cross sectional shape. Also, as shown in FIG. 27, ridge 2570 may terminate at an end wall 2585.

In some embodiments, inner aperture 2545 and outer aperture 2550 may have longitudinally elongate/slotted configurations, as shown in FIG. 27. This configuration may enable an inserted connecting rod to longitudinally translate within apertures 2545 and 2550. The connecting rod may be inserted into aperture 2550 and into the forward end of inner aperture 2545 in a rod insertion and withdrawal position. In order to secure the connecting rod in first link 2510, the connecting rod may then be longitudinally translated beyond rod retaining ridge 2570 and toward the rearward end of inner aperture 2545. It should also be noted that, in some embodiments, inner aperture 2545 may have two components, such as an inner opening 2546 and an outer opening 2547, for example due to a central opening within inner link leg 2530.

Figure 28:
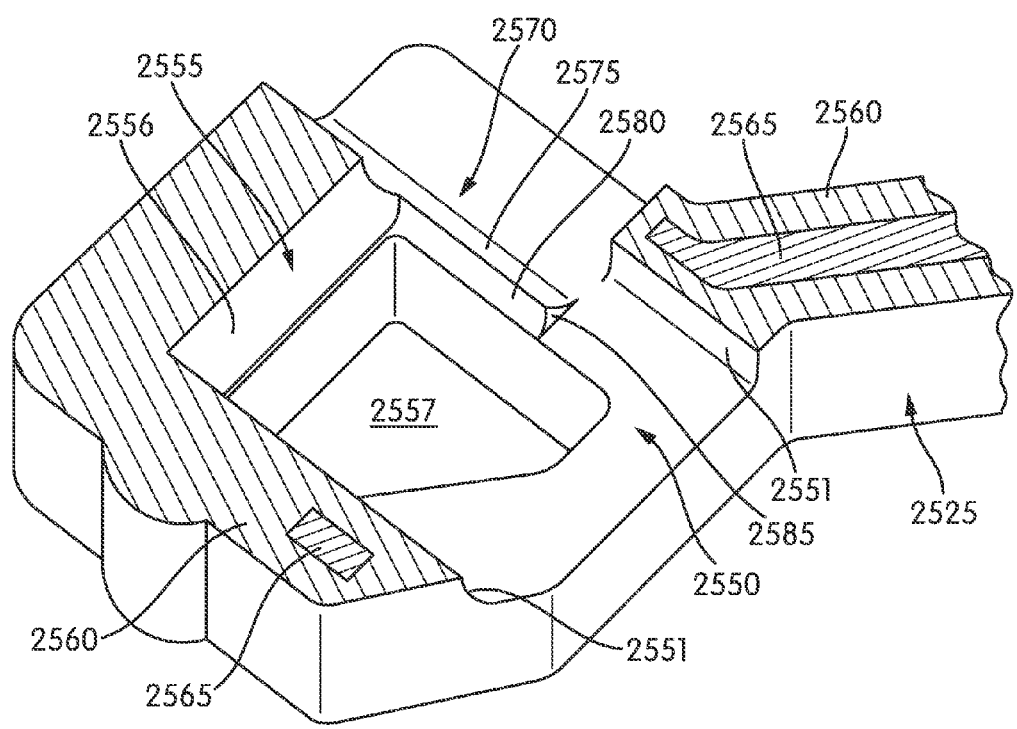
FIG. 28 is an enlarged view of a portion of the composite link shown in FIG. 27.

FIG. 28 illustrates an enlarged, perspective, cut-away, cross-sectional view of first link 2510. As shown in FIG. 28, outer end aperture 2550 may be defined by a curved wall 2551. In addition, recess 2555 may be defined, at least in part, by an end wall 2556, which prevents movement of the connecting rod in a lateral direction when retained in recess 2555 by rod retaining ridge 2570. Also, as further shown in FIG. 28, first link 2510 may include a central opening 2557 in outer link leg 2525. Such a central opening may enable use of a reduced amount of material for bearing structure 2560 and/or supporting structure 2565.

Alternatively, or additionally, other configurations of rod retaining features may also be implemented. For example, in some embodiments, the rod retaining feature may include a mechanical attachment, rigidly connecting the rod to the first link. In addition to the protective benefits, incorporating features in bearing structure 320 to retain rod 220 may eliminate the need to weld rod 220 to link 210, among other things.

Embodiments of such link rod retaining features are more fully disclosed in U.S. Pat. No. 7,073,662, entitled "Conveyor Belt and Method of Assembly." Additional rod retaining features are disclosed in U.S. application Ser. No. 13/311,773, which published as U.S. Publication No. 2013/0140146; U.S. application Ser. No. 13/311,797, which issued as U.S. Pat. No. 8,720,676; U.S. application Ser. No. 13/311,882, which issued as U.S. Pat. No. 8,636,141; U.S. application Ser. No. 13/311,888, which issued as U.S. Pat. No. 8,607,967; and U.S. application Ser. No. 13/311,900, which published as U.S. Publication No. 2013/0140152, each of which was filed on Dec. 6, 2011, and is entitled "Conveyor Belt Link with Rod Retaining Feature." Each of the patent documents mentioned in this paragraph is incorporated herein in its entirety by reference.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. In addition, features of any of the disclosed embodiments can be implemented in any of the other disclosed embodiments. Also, various modifications and changes may be made within the scope of the attached claims.

What is claimed is:

1. A link for a modular conveyor belt configured to be attached to a connecting rod, comprising:
    a supporting structure having a surface that at least partially defines a shape of the supporting structure; and
    a bearing structure that is attached to the supporting structure, the bearing structure having a predetermined outer shape that is independent of the shape of the supporting structure, the bearing structure having a covering portion covering at least a portion of the surface of the supporting structure, the covering portion configured to be disposed between the surface and the connecting rod, the covering portion configured to abut the connecting rod and separate the surface away from the connecting rod;
    wherein the supporting structure has a tensile strength that is higher than the bearing structure; and
    wherein the bearing structure is more resistant to wear than the supporting structure.

2. The link of claim 1, wherein the bearing structure completely encloses the supporting structure.

3. The link of claim 2, wherein a material of the bearing structure is overmolded on the supporting structure.

4. The link of claim 1, wherein the bearing structure is at least partially formed of plastic, ceramic, fiber reinforced material, steel, brass, or aluminum.

5. The link of claim 1, wherein the supporting structure is at least partially formed of steel, brass, aluminum, ceramic, fiber reinforced material, or plastic.

6. The link of claim 1, wherein the supporting structure is formed of metal and the bearing structure is formed of plastic.

7. The link of claim 1, wherein a volume of the supporting structure is greater than 50 percent of a total volume of the link.

8. The link of claim 1, wherein the bearing structure is removably coupled to the supporting structure.

9. The link of claim 1, wherein at least one of the supporting structure and the bearing structure comprises one continuous segment of the link.

10. The link of claim 1, wherein at least one of the supporting structure and the bearing structure comprises two or more discontinuous segments of the link.

11. The link of claim 1, wherein at least one of the supporting structure and the bearing structure defines a portion of a product support surface of the link.

12. The link of claim 1, wherein the supporting structure is configured to transmit substantially all tensile forces to which the link is subjected, and the bearing structure is configured to receive only compressive forces.

13. The link of claim 1, wherein the bearing structure is configured to transmit at least a portion of the tensile forces to which the link is subjected.

14. The link of claim 1, wherein the bearing structure is overmolded on the supporting structure.

15. The link of claim 1, wherein the link has a substantially U-shaped configuration formed by a first longitudinally oriented leg, a second longitudinally oriented leg, and a laterally oriented cross-member between the first and second legs, wherein the first and second legs each include a forward end proximate the cross-member and a trailing end separated at a distance from the cross-member, wherein the cross-member extends between the forward end of the first and second legs;

wherein a first aperture extends through the forward end of the first leg, wherein a second aperture extends through the forward end of the second leg, wherein the first aperture and the second aperture are both configured to receive the connecting rod, wherein a third aperture extends through the trailing end of the first leg, wherein a fourth aperture extends through the trailing end of the second leg, wherein the third and fourth apertures are configured to receive an additional connecting rod, wherein the covering portion of the bearing structure covers at least one of an inner surface of the first aperture, an inner surface of the second aperture, an inner surface of the third aperture, an inner surface of the fourth aperture, and the cross-member.

16. The link of claim 15, wherein at least one of the first, second, third, and fourth apertures is longitudinally slotted.

17. The link of claim 1, wherein the bearing structure defines a rod retaining feature configured to prevent a connecting rod from withdrawing from the conveyor belt.

18. The link of claim 1, wherein the supporting structure includes an aperture configured to receive the connecting rod;

wherein the aperture is defined by an inner surface of the supporting structure;

wherein the covering portion of the bearing structure is disposed outside the aperture; and wherein the covering portion is configured to abut the connecting rod and prevent the connecting rod from contacting the inner surface of the aperture.

19. The link of claim 1, wherein the bearing structure has a thickness measured substantially normal to the supporting structure; and wherein the thickness of the bearing structure in a first area of the link is different from the thickness of the bearing structure in a second area of the link.

20. The link of claim 1, wherein the supporting structure is electrically insulative.

21. The link of claim 20, wherein the supporting structure is made out of plastic.

22. The link of claim 1, wherein the predetermined outer shape of the bearing structure is independent of the shape of the supporting structure such that:

the surface of the supporting structure has a first contour;

the covering portion of the bearing structure has an outermost surface that overlaps the surface of the supporting structure;

the outermost surface has a second contour; and the first contour is disproportionate to the second contour.

23. The link of claim 1, wherein the supporting structure includes a rod receiving aperture configured to receive the connecting rod, wherein the surface is an inner surface of the rod receiving aperture.

24. The link of claim 1, wherein the bearing structure has a thickness measured substantially normal to the supporting structure; and wherein the thickness of the bearing structure is substantially constant along the bearing structure.

25. The link of claim 1, wherein the bearing structure is coupled to the support structure by at least one of a fastener, a mechanical interlocking feature, and a snap-fit feature.

26. The link of claim 1, wherein the supporting structure is formed of plastic and the bearing structure is formed of metal.

27. The link of claim 1, wherein a volume of the supporting structure is less than 50 percent of a total volume of the link.

28. A link for a modular conveyor belt including an elongated connecting rod, the link comprising:

a supporting structure formed of a first material, wherein the supporting structure includes a contour that establishes a shape of the composite link, and wherein the supporting structure has a surface; and a bearing structure formed of a second material, the bearing structure being overmolded on the supporting structure, the bearing structure having a covering portion, wherein the covering portion of the bearing structure is located on the surface of the supporting structure;

wherein the covering portion of the bearing structure is configured to be disposed between the surface and the connecting rod to prevent the connecting rod from contacting the surface of the supporting structure.

29. The link of claim 28, wherein the supporting structure is formed of metal and the bearing structure is formed of plastic.

30. The link of claim 28, wherein the supporting structure includes a rod receiving aperture that receives the connecting rod, wherein the surface is an inner surface of the rod receiving aperture.

31. The link of claim 28, wherein the bearing structure is located on a second surface of the supporting structure that is configured to contact a driving mechanism of the conveyor belt.

32. The link of claim 28, wherein the bearing structure is located on a third surface of the supporting structure that is configured to contact another link of the conveyor belt.

33. The link of claim 28, wherein the supporting structure includes an aperture configured to receive the connecting rod;

wherein the aperture is defined by an inner surface of the supporting structure;

wherein the covering portion of the bearing structure is disposed outside the aperture; and wherein the covering portion is configured to abut the connecting rod and prevent the connecting rod from contacting the inner surface of the aperture.

34. The link of claim 28, wherein the link has a substantially U-shaped configuration formed by a first longitudinally oriented leg, a second longitudinally oriented leg, and a laterally oriented cross-member between the first and second legs, wherein the first and second legs each include a forward end proximate the cross-member and a trailing end separated at a distance from the cross-member, wherein a first aperture extends through the forward end of the first leg, wherein a second aperture extends through the forward end of the second leg, wherein the first aperture and the second aperture are both configured to receive the connecting rod, wherein a third aperture extends through the trailing end of the first leg, wherein a fourth aperture extends through the trailing end of the second leg, wherein the third and fourth apertures are configured to receive an additional connecting rod.

35. The link of claim 34, wherein the covering portion of the bearing structure covers at least a portion of an inner surface of at least one of the first aperture, the second aperture, the third aperture, and the fourth aperture.

36. The link of claim 34, wherein the bearing structure covers at least part of the cross-member.

37. The link of claim 34, wherein at least one of the first, second, third, and fourth apertures is an outer end aperture, and wherein the bearing structure defines a rod retaining feature proximate to the outer end aperture, the rod retaining feature being configured to prevent the connecting rod from withdrawing from the conveyor belt.

38. The link of claim 37, wherein the outer end aperture is longitudinally slotted, to allow the rod to longitudinally translate from an insertion and withdrawal position to an operation position, and wherein the rod retaining feature includes a laterally oriented ridge configured to inhibit the longitudinal translation of the rod.

39. A modular conveyor belt, comprising:
at least a first link and a second link; and
an elongated connecting rod configured to hingedly attach the first link and the second link to one another;
wherein the first link includes a supporting structure and a bearing structure, the bearing structure including a covering portion covering a surface of the supporting structure, the covering portion disposed between the surface and the connecting rod, the covering portion configured to abut the connecting rod and separate the surface away from the connecting rod, the supporting structure having a tensile strength that is higher than the bearing structure, and the bearing structure being more resistant to wear than the supporting structure;
wherein the bearing structure is removably attached to the support structure; and
wherein the bearing structure has a thickness measured substantially normal to the supporting structure; and
wherein the thickness of the bearing structure in a first area of the first link is different from the thickness of the bearing structure in a second area of the first link.

40. The conveyor belt of claim 39, wherein the supporting structure includes a second surface that faces at least one of an adjacent link, a stationary portion of a frame of a conveyor, and a drive component of the conveyor, wherein the bearing structure at least partially covers the second surface to prevent the second surface of the supporting structure from contacting the at least one of the adjacent link, the stationary portion of a frame of a conveyor, and the drive component of the conveyor.

41. The conveyor belt of claim 39, wherein the bearing structure is retained on the supporting structure by the connecting rod.

42. The conveyor belt of claim 39, wherein the bearing structure is positioned between the connecting rod and a portion of the supporting structure such that longitudinal forces are transmitted from the connecting rod to the supporting structure through the bearing structure.

43. The conveyor belt of claim 39, wherein longitudinal forces applied to the link are directed through both the bearing structure and the supporting structure.

44. The conveyor belt of claim 39,
wherein the first link has a substantially U-shaped configuration formed by a first longitudinally oriented leg, a second longitudinally oriented leg, and a laterally oriented cross-member between the first and second legs, wherein the first and second legs each include a forward end proximate the cross-member and a trailing end separated at a distance from the cross-member, wherein the cross-member extends between the forward end of the first and second legs;
wherein the surface of the supporting structure is defined on the cross-member; and
wherein the covering portion of the bearing structure covers the surface on the cross-member.

45. The conveyor belt of claim 39, wherein the bearing structure completely encloses the supporting structure.

46. The link of claim 39, wherein the supporting structure includes a rod receiving aperture configured to receive the connecting rod, wherein the surface is an inner surface of the rod receiving aperture.

47. The conveyor belt of claim 39, wherein the first link includes an aperture configured to receive the rod, wherein the aperture is defined by an inner surface, wherein the bearing structure is disposed outside the aperture, and wherein the bearing structure is configured to abut the rod and prevent contact between the rod and the inner surface of the supporting structure at the aperture.

48. The conveyor belt of claim 47, wherein the bearing structure includes an additional contact portion located between a second engagement surface of the supporting structure and a driving mechanism of the conveyor belt.

49. The conveyor belt of claim 39, wherein the second link includes a rod retaining feature, and wherein the rod retaining feature includes a mechanical attachment, rigidly connecting the rod to the second link.

50. The conveyor belt of claim 49, wherein the mechanical attachment includes a weld.

51. The conveyor belt of claim 39, wherein the first link includes a rod retaining feature formed by at least one of the bearing structure and the supporting structure.

52. The conveyor belt of claim 51, wherein the first link includes an outer end aperture, and the bearing structure defines the rod retaining feature proximate to the outer end aperture, the rod retaining feature being configured to prevent the connecting rod from withdrawing from the conveyor belt.

53. The conveyor belt of claim 52, wherein the outer end aperture is longitudinally slotted, to allow the rod to longitudinally translate from an insertion and withdrawal position to an operation position, and wherein the rod retaining feature includes a laterally oriented ridge configured to inhibit the longitudinal translation of the rod.

* * * * *